US012244072B2

(12) United States Patent
Ueda et al.

(10) Patent No.: US 12,244,072 B2
(45) Date of Patent: Mar. 4, 2025

(54) ANTENNA DEVICE AND COMMUNICATION DEVICE

(71) Applicant: Murata Manufacturing Co., Ltd., Nagaokakyo (JP)

(72) Inventors: Hideki Ueda, Nagaokakyo (JP); Yasuhisa Yamamoto, Nagaokakyo (JP); Masashi Omuro, Nagaokakyo (JP); Kazunari Kawahata, Nagaokakyo (JP); Satoshi Tanaka, Nagaokakyo (JP); Ryuken Mizunuma, Nagaokakyo (JP)

(73) Assignee: GLORY LTD., Himeji (JP)

( * ) Notice: Subject to any disclaimer, the term of this patent is extended or adjusted under 35 U.S.C. 154(b) by 174 days.

(21) Appl. No.: 17/672,696

(22) Filed: Feb. 16, 2022

(65) Prior Publication Data

US 2022/0173530 A1 Jun. 2, 2022

Related U.S. Application Data

(63) Continuation of application No. PCT/JP2020/026726, filed on Jul. 8, 2020.

(30) Foreign Application Priority Data

Aug. 19, 2019 (JP) ................................ 2019-149900

(51) Int. Cl.
*H01Q 21/30* (2006.01)
*H01Q 13/08* (2006.01)
(Continued)

(52) U.S. Cl.
CPC ............ *H01Q 21/30* (2013.01); *H01Q 13/08* (2013.01); *H01Q 21/065* (2013.01); *H01Q 21/24* (2013.01)

(58) Field of Classification Search
CPC ........................................................ H01Q 1/42
(Continued)

(56) References Cited

U.S. PATENT DOCUMENTS 10,594,019 B2 * 3/2020 Baks ...................... H01Q 9/045
11,322,836 B2 * 5/2022 Kim ...................... H01Q 21/28
(Continued)

FOREIGN PATENT DOCUMENTS

CN 101465473 A 6/2009
CN 104051867 * 9/2014
(Continued)

OTHER PUBLICATIONS

Action issued Jul. 12, 2023 in Chinese Patent Application No. 202080058233.0, 14 pages.
(Continued)

*Primary Examiner* — Hoang V Nguyen
*Assistant Examiner* — Brandon Sean Woods
(74) *Attorney, Agent, or Firm* — XSENSUS LLP

(57) ABSTRACT

An antenna device comprises a substrate including a planar first region and a planar second region; at least one first radiating element, arranged in the first region, that communicates a radio wave of a first frequency; and at least one second radiating element, arranged in the second region, that communicates a radio wave of a second frequency. A separation direction is a direction of a straight line connecting a first geometric center position of the at least one first radiating element and a second geometric center position of the at least one second radiating element, and in a case that the second region is viewed along a normal direction of the second region, an angle formed by the separation direction and a polarization direction of the at least one second radiating element is equal to or greater than 45° and equal to or less than 90°.

20 Claims, 20 Drawing Sheets

(51) Int. Cl.
*H01Q 21/06* (2006.01)
*H01Q 21/24* (2006.01)

(58) Field of Classification Search
USPC .......................................................... 343/842
See application file for complete search history.

(56) References Cited

U.S. PATENT DOCUMENTS

| | | | | |
|---|---|---|---|---|
| 2016/0268693 | A1* | 9/2016 | Ding ...................... | H01Q 1/526 |
| 2019/0157762 | A1 | 5/2019 | Shibata et al. | |
| 2020/0343629 | A1 | 10/2020 | Kim et al. | |

FOREIGN PATENT DOCUMENTS

| | | | | |
|---|---|---|---|---|
| CN | 108448258 | | * | 8/2018 |
| CN | 110034377 | A | | 7/2019 |
| JP | 60-1014 | U | | 1/1985 |
| JP | 6-224628 | A | | 8/1994 |
| JP | 2003-124830 | A | | 4/2003 |
| JP | 2013219533 | A | * | 10/2013 |
| JP | 2019-092130 | A | | 6/2019 |
| TW | M497350 | U | * | 3/2015 |
| WO | WO 2011124094 | | * | 10/2011 |

OTHER PUBLICATIONS

International Search Report and Written Opinion mailed on Oct. 6, 2020, received for PCT Application PCT/JP2020/026726, Filed on Jul. 8, 2020, 9 pages including English Translation.
Written Opinion of the International Searching Authority mailed on Oct. 6, 2020, received for PCT Application PCT/JP2020/026726, filed on Jul. 8, 2020, 4 pages. (Previously filed; submitting English translation only.).
Office Action for Chinese Application No. CN 202080058233.0, mailed Jan. 24, 2024, 17 pages (machine generated translation attached).
Third Office Action issued May 28, 2024 in corresponding Chinese Application No. 202080058233.0.

* cited by examiner

ANTENNA DEVICE AND COMMUNICATION DEVICE

CROSS-REFERENCE TO RELATED APPLICATIONS

This application is a continuation of PCT/JP2020/026726, filed in Japan on Jul. 8, 2020, which claims priority to JP 2019-149900, filed in Japan on Aug. 19, 2019, the contents of both of which are incorporated by reference in their entirety.

TECHNICAL FIELD

The present disclosure relates to an antenna device and a communication device in which the antenna device is mounted.

BACKGROUND

Development of communication devices in which a fifth generation (5G) communication system using a 28 GHz band or a 39 GHz band, a millimeter wave radar using the millimeter wave of 60 GHz or 79 GHz, a gesture sensor, and the like are mixed has been advanced. An antenna device that transmits and receives radio waves of two different frequencies is disclosed in Patent Document 1 below.

Conventionally, an antenna device may include a high-frequency antenna in a lower layer and a low-frequency antenna in an upper layer stacked thereon. The high-frequency antenna includes a ground conductor and a plurality of radiating elements thereon. The low-frequency antenna includes a ground conductor arranged on the high-frequency antenna and a plurality of radiating elements arranged on the ground conductor. The ground conductor of the low-frequency antenna functions as a ground for radio waves in an operating frequency band of the low-frequency antenna, and has such frequency selectivity as to be electrically transparent in the operating frequency band of the high-frequency antenna.

SUMMARY

According to one aspect of the present disclosure, an antenna device comprises a substrate including a planar first region and a planar second region; at least one first radiating element, arranged in the first region of the substrate, configured to perform at least one of transmission and reception of a radio wave of a first frequency; and at least one second radiating element, arranged in the second region of the substrate, configured to perform at least one of transmission and reception of a radio wave of a second frequency higher than the first frequency. A separation direction is a direction of a straight line connecting a first geometric center position of the at least one first radiating element and a second geometric center position of the at least one second radiating element. In a case that the second region is viewed along a normal direction of the second region, an angle formed by the separation direction and a polarization direction of the at least one second radiating element is equal to or greater than 45° and equal to or less than 90°.

DETAILED DESCRIPTION OF THE DRAWINGS

Figure 1A:
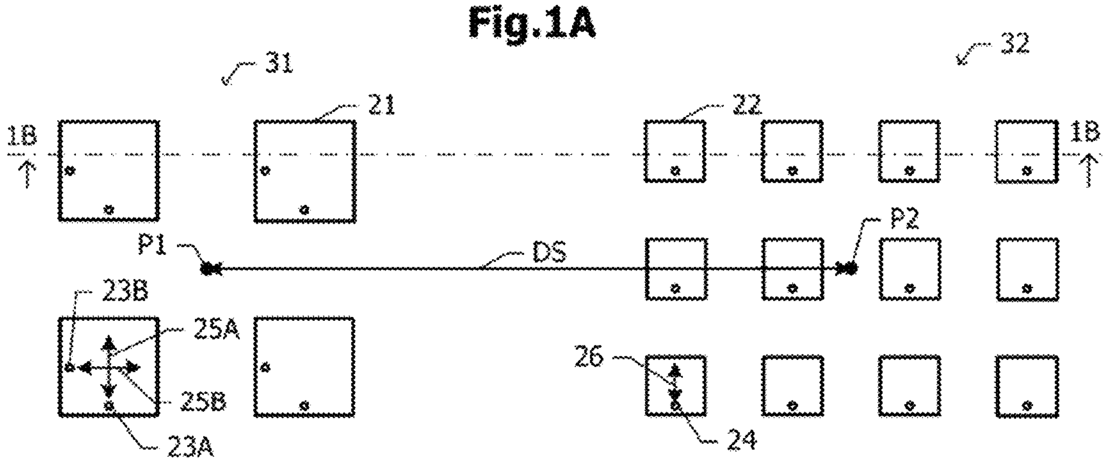
FIG. 1A is a diagram illustrating an arrangement of a plurality of radiating elements of an antenna device according to a first example.

The inventors of the present disclosure have recognized a case in which a frequency band of a higher harmonic wave of an operating frequency of a low-frequency antenna and an operating frequency band of a high-frequency antenna overlap with each other, when the low-frequency antenna and the high-frequency antenna are operated simultaneously, the higher harmonic wave radiated from the low-frequency antenna is received by the high-frequency antenna and becomes noise. When the output of the low-frequency antenna is larger than the output of the high-frequency antenna, this noise is significant.

The inventors of the present disclosure have developed technology to address these issues, an antenna device in which isolation between an antenna for performing at least one of transmission and reception of a radio wave at a relatively high-frequency and an antenna for performing at least one of transmission and reception of a radio wave at a relatively low-frequency is improved. Additionally, a communication device in which an antenna for performing at least one of transmission and reception of a radio wave at a relatively high-frequency and an antenna for performing at least one of transmission and reception of a radio wave at a relatively low-frequency are mounted and isolation between the antennas is improved.

Among the radio waves radiated from the first radiating element, an influence on the second radiating element by higher harmonic components overlapping with an operating frequency band of the second radiating element is reduced. Thus, isolation between the first radiating element and the second radiating element can be enhanced.

In accordance with the present disclosure, an antenna device includes: a support member in which a planar first region and a planar second region are defined; at least one first radiating element arranged in the first region of the support member and configured to perform at least one of transmission and reception of a radio wave of a first frequency; and at least one second radiating element arranged in the second region of the support member and configured to perform at least one of transmission and reception of a radio wave of a second frequency higher than the first frequency, in which when the second region is viewed along a normal direction of the second region, an angle formed by a separation direction, which is a direction of a straight line connecting a geometric center position of all of the first radiating element and a geometric center position of all of the second radiating element, and a polarization direction of the second radiating element is equal to or greater than 45° and equal to or less than 90°.

According to another aspect of the present disclosure, an antenna device includes: a support member in which a planar first region and a planar second region are defined; at least one first radiating element arranged in the first region and configured to perform at least one of transmission and reception of a radio wave of a first frequency; and at least one second radiating element arranged in the second region and configured to perform at least one of transmission and reception of a radio wave of a second frequency higher than the first frequency, in which the second radiating element forms a patch antenna together with a ground conductor, and when the second region is viewed along a normal direction of the second region, an angle formed by a separation direction, which is a direction of a straight line connecting a geometric center position of all of the first radiating element and a geometric center position of all of the second radiating element, and a direction connecting a geometric center position of each of the second radiating elements in a plan view and a feeding point is equal to or greater than 45° and equal to or less than 90°.

According to still another aspect of the present disclosure, a communication device includes: the antenna device described above; and a housing made of a dielectric material and arranged so as to be spaced apart from the first region and the second region in a direction orthogonal to the first region and the second region, in which a ground conductor is arranged in the support member between the first region and the second region in a plan view, and an interval from the ground conductor to the housing is equal to or less than 0.5 times a wave length determined by an operating frequency of the second radiating element.

According to still another aspect of the present disclosure, a communication device includes: the antenna device described above; a housing made of a dielectric material and arranged so as to be spaced apart from the first region and the second region in a direction orthogonal to the first region and the second region; and a metal strip provided in the housing, wherein the metal strip is arranged between the first region and the second region in a plan view.

First Example

An antenna device according to a first example and a communication device in which the antenna device is mounted will be described with reference to the drawings of FIG. 1A to FIG. 3.

Figure 1B:
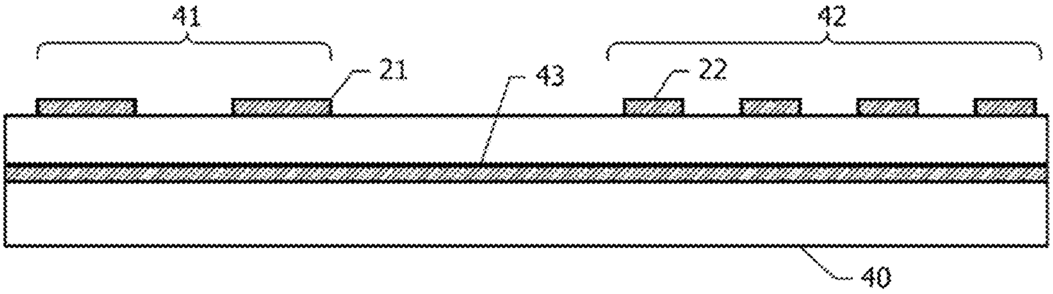
FIG. 1B is a cross-sectional view taken along a dashed-dotted line 1B-1B of FIG. 1A.

FIG. 1A is a diagram illustrating an arrangement of a plurality of radiating elements of the antenna device according to the first example, and FIG. 1B is a cross-sectional view taken along a dashed-dotted line 1B-1B of FIG. 1A.

The antenna device according to the first example includes a plurality of first radiating elements 21 and a plurality of second radiating elements 22. The first radiating element 21 and the second radiating element 22 are arranged in a first region 41 and a second region 42, respectively, on a surface of a substrate 40 made of a dielectric material. The first region 41 and the second region 42 are defined at different positions on the same surface of the substrate 40. That is, the first region 41 and the second region 42 both have a planar shape and are located on the same plane. The substrate 40 functions as a support member that mechanically supports the first radiating element 21 and the second radiating element 22.

A ground conductor 43 is arranged in an inner layer of the substrate 40. The ground conductor 43 is also arranged between the first region 41 and the second region 42 from the first region 41 to the second region 42 in a plan view, and functions as a common antenna ground for the first radiating element 21 and the second radiating element 22. The first radiating element 21 and the ground conductor 43 configure a patch antenna, and the second radiating element 22 and the ground conductor 43 configure another patch antenna. The plurality of first radiating elements 21 and the ground conductor 43 configure a first array antenna 31, and the plurality of second radiating elements 22 and the ground conductor 43 configure a second array antenna 32.

For the first radiating element 21, the second radiating element 22, the ground conductor 43, and other via conductors, wiring, and the like provided in the substrate 40, for example, a metal containing Al, Cu, Au, Ag, or an alloy thereof as a main component is used. For example, a low temperature co-fired ceramics multilayer substrate ((LTCC: Low Temperature Co-fired Ceramics) multilayer substrate) is used as the substrate 40. In addition, a multilayer resin substrate formed by laminating a plurality of resin layers made of resin such as epoxy, polyimide, or the like, a multilayer resin substrate formed by laminating a plurality of resin layers made of a liquid crystal polymer (LCP) having a low dielectric constant, a multilayer resin substrate formed by laminating a plurality of resin layers made of a fluorine-based resin, a ceramics multilayer substrate which is not fired at a low temperature, or the like may be used.

The first radiating element 21 operates at a first frequency f1, and the second radiating element 22 operates at a second frequency f2. The second frequency f2 is higher than the first frequency f1. Here, the first frequency f1 and the second frequency f2 can be defined as frequencies at which a voltage standing wave ratio (VSWR) of each of the first radiating element 21 and the second radiating element 22 becomes minimum. In the present specification, a frequency at which a voltage standing wave ratio (VSWR) is minimized may be referred to as an "operating frequency". Here, "an antenna operates at a certain frequency" means that the antenna performs at least one of transmission and reception of a radio wave at the frequency.

Each of the first radiating element 21 and the second radiating element 22 has a square shape in a plan view. In a plan view, a direction of a straight line connecting a geometric center position P1 of all of the plurality of first radiating elements 21 and a geometric center position P2 of all of the plurality of second radiating elements 22 is referred to as a separation direction DS. A direction of the line of intersection between the surface of the substrate 40 and a virtual plane that includes a straight line connecting the geometric center positions P1 and P2 and is perpendicular to the surface of the substrate 40 coincides with the separation direction DS. The geometric center positions P1 and P2 correspond to the centers of the first array antenna 31 and the second array antenna 32, respectively. A pair of edges of the first radiating element 21 facing each other and a pair of edges of the second radiating element 22 facing each other are parallel to the separation direction DS. Other edges of the first radiating element 21 and the second radiating element 22 are orthogonal to the separation direction DS. The plurality of first radiating elements 21 and the plurality of second radiating elements 22 each are arranged in a matrix, and the row direction is parallel to the separation direction DS. For example, four first radiating elements 21 are arranged in a matrix of two rows and two columns, and twelve second radiating elements 22 are arranged in a matrix of three rows and four columns.

Each of the first radiating elements 21 is provided with two feeding points 23A and 23B. The feeding point 23A is arranged between the center of the first radiating element 21 and the middle point of one edge (lower edge in FIG. 1A) parallel to the separation direction DS of the first radiating element 21. The feeding point 23B is arranged between the center of the first radiating element 21 and the midpoint of one edge (left edge in FIG. 1A) perpendicular to the separation direction DS of the first radiating element 21. Note that the feeding point 23A may be arranged between the midpoint of an upper edge and the center of the first radiating element 21 in FIG. 1A. Further, the feeding point 23B may be arranged between the middle point of a right edge and the center of the first radiating element 21 in FIG. 1A. A polarization direction 25A (a direction of the line of intersection between a polarization plane and the first region 41) of radio waves radiated when power is fed to the feeding point 23A is perpendicular to the separation direction DS. A polarization direction 25B (a direction of the line of intersection between the polarization plane and the first region 41) of radio waves radiated when power is supplied to the feeding point 23B is parallel to the separation direction DS.

One feeding point 24 is provided for each of the second radiating elements 22. The feeding point 24 is arranged between the center of the second radiating element 22 and the midpoint of one edge (the lower edge in FIG. 1A) parallel to the separation direction DS of the second radiating element 22. Note that the feeding point 24 may be arranged between the midpoint of the upper edge and the center of the second radiating element 22 in FIG. 1A. A polarization direction 26 (a direction of the line of intersection between the polarization plane and the second region 42) of radio waves radiated when power is fed to the feeding point 24 is perpendicular to the separation direction DS.

Figure 2:
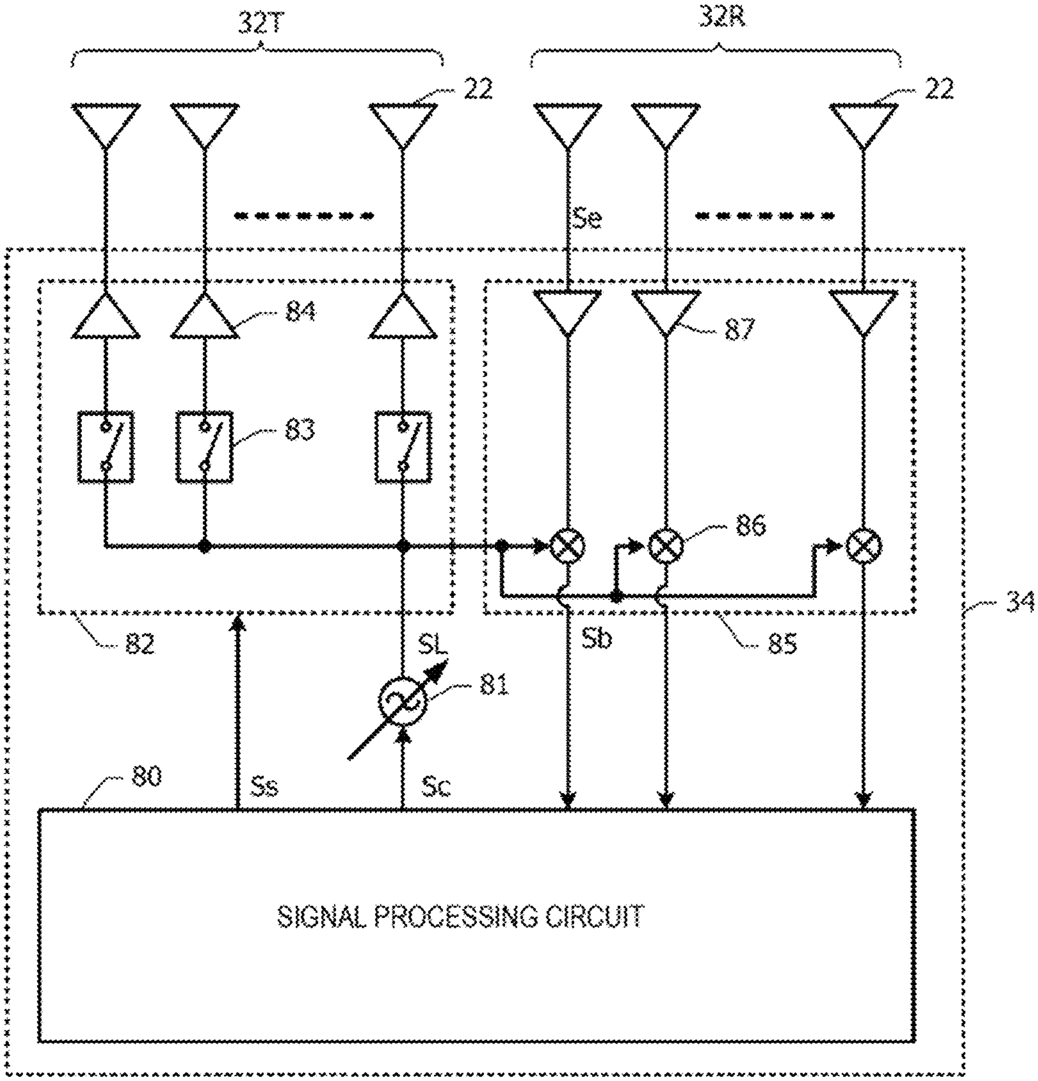
FIG. 2 is a block diagram of a radar function portion of a communication device in which the antenna device according to the first example is mounted.

FIG. 2 is a block diagram of a radar function portion of a communication device in which the antenna device is mounted according to the first example. The radar function portion includes time division multiple access (TDMA), frequency modulated continuous wave (FMCW), and multi-input multi-output (MIMO) functions. A part of the plurality of second radiating elements 22 configures a second array antenna 32T for transmission, and the remaining plurality of second radiating elements 22 configures a second array antenna 32R for reception.

A second transmission/reception circuit 34 supplies high-frequency signals to the plurality of second radiating elements 22 of the second array antenna 32T for transmission. High-frequency signals received by the plurality of second radiating elements 22 of the second array antenna 32R for reception are input to the second transmission/reception circuit 34. The second transmission/reception circuit 34 includes a signal processing circuit 80, a local oscillator 81, a transmission processing unit 82, and a reception processing unit 85.

Based on a chirp control signal Sc from the signal processing circuit 80, the local oscillator 81 outputs a local signal SL whose frequency increases or decreases linearly with time. The local signal SL is provided to the transmission processing unit 82 and the reception processing unit 85.

The transmission processing unit 82 includes a plurality of switches 83 and power amplifiers 84. The switch 83 and the power amplifier 84 are provided for each second radiating element 22 configuring the second array antenna 32T for transmission. The switch 83 is turned on and off based on a switching control signal Ss from the signal processing circuit 80. In a state where the switch 83 is turned on, the local signal SL is input to the power amplifier 84. The power amplifier 84 amplifies power of the local signal SL and supplies the amplified power to the corresponding second radiating element 22.

Radio waves radiated from the second array antenna 32T for transmission are reflected by a target, and reflected waves are received by the second array antenna 32R for reception.

The reception processing unit 85 includes a plurality of low noise amplifiers 87 and mixers 86. The low noise amplifier 87 and the mixer 86 are provided for each of the second radiating elements 22 configuring the second array antenna 32R for reception. Echo signals Se received by the plurality of second radiating elements 22 configuring the second array antenna 32T are amplified by the low noise amplifier 87. The mixer 86 multiplies the amplified echo signal Se by the local signal SL to generate a beat signal Sb.

The signal processing circuit 80 includes, for example, an AD converter, a microcomputer, and the like, and performs signal processing on the beat signal Sb to calculate the distance to the target and the azimuth.

Figure 3:
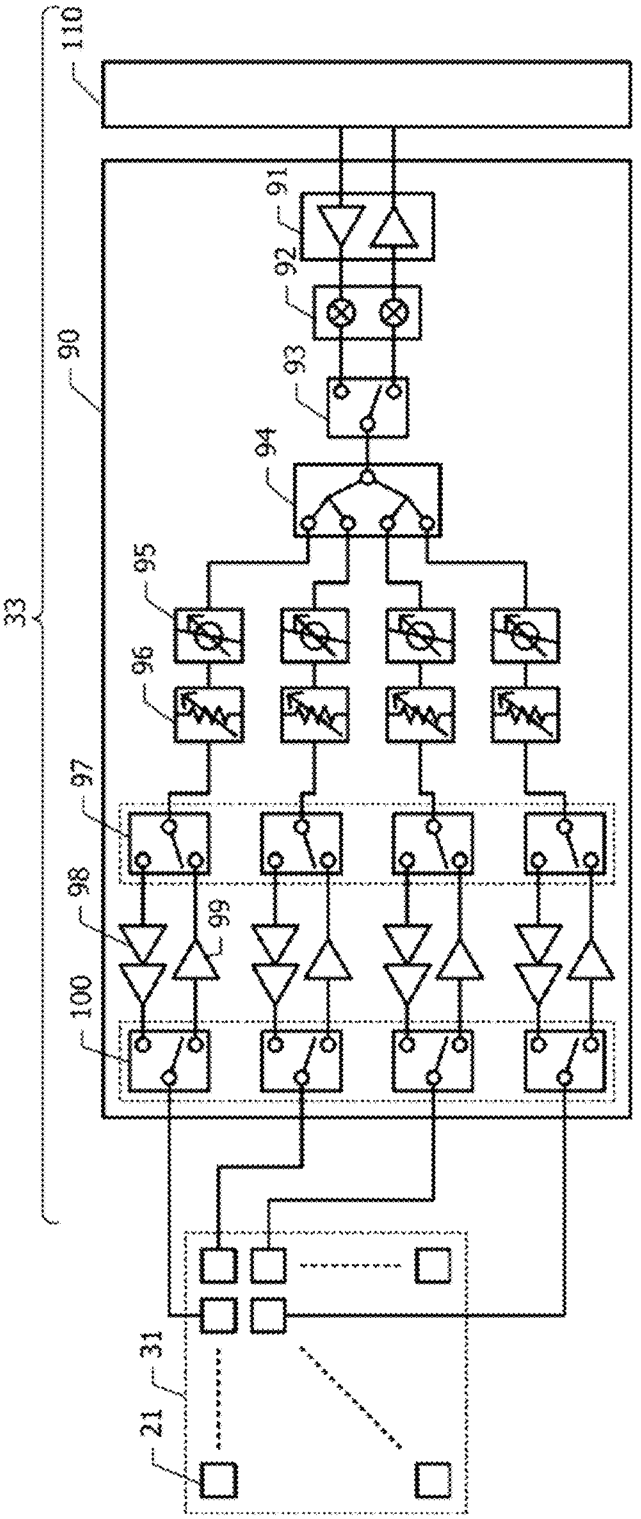
FIG. 3 is a block diagram of a communication function portion of the communication device in which the antenna device according to the first example is mounted.

FIG. 3 is a block diagram of a communication function portion of the communication device in which the antenna device is mounted according to the first example. A high-frequency signal is supplied from a first transmission/reception circuit 33 to the first radiating element 21 of the first array antenna 31, and the high-frequency signal received by the first radiating element 21 is input to the first transmission/reception circuit 33.

The first transmission/reception circuit 33 includes a baseband integrated circuit element (BBIC) 110 and a high-frequency integrated circuit element (RFIC) 90. The high-frequency integrated circuit element 90 includes an intermediate frequency amplifier 91, an up-down conversion mixer 92, a transmission/reception switch 93, a power divider 94, a plurality of phase shifters 95, a plurality of attenuators 96, a plurality of transmission/reception switches 97, a plurality of power amplifiers 98, a plurality of low noise amplifiers 99, and a plurality of transmission/reception switches 100.

First, the transmission function will be described. An intermediate frequency signal is input from the baseband integrated circuit element 110 to the up-down conversion mixer 92 via the intermediate frequency amplifier 91. A high-frequency signal generated by up-converting the intermediate frequency signal in the up-down conversion mixer 92 is input to the power divider 94 via the transmission/reception switch 93. Each of the high-frequency signals divided by the power divider 94 is input to the first radiating element 21 via the phase shifter 95, the attenuator 96, the transmission/reception switch 97, the power amplifier 98, and the transmission/reception switch 100.

Next, the receiving function will be described. The high-frequency signal received by each of the plurality of first radiating elements 21 is input to the power divider 94 via the transmission/reception switch 100, the low noise amplifier 99, the transmission/reception switch 97, the attenuator 96, and the phase shifter 95. The high-frequency signal combined by the power divider 94 is input to the up-down conversion mixer 92 via the transmission/reception switch 93. An intermediate frequency signal generated by down-converting a high-frequency signal in the up-down conversion mixer 92 is input to the baseband integrated circuit element 110 via the intermediate frequency amplifier 91.

Next, advantageous effects of the antenna device according to the first example will be described.

Among the radio waves radiated from the first radiating element 21, a radio wave in the polarization direction 25B parallel to the separation direction DS has a property of being more likely to propagate in the separation direction DS on the substrate 40 than a radio wave in the polarization direction 25A perpendicular to the separation direction DS. The polarization direction 26 of the second radiating element 22 and the polarization direction 25B of the radio wave that is likely to propagate in the separation direction DS are orthogonal to each other. As such, the second radiating element 22 is less likely to be affected by the radio wave in the polarization direction 25B that is radiated from the first radiating element 21 and propagates in the direction of the second radiating element 22. Therefore, even when a higher harmonic wave of the first frequency f1 overlaps with a frequency band in which the second radiating element 22 operates, the second radiating element 22 is less likely to be affected by higher harmonic components of the radio wave in the polarization direction 25B radiated from the first radiating element 21.

Further, the radio wave in the polarization direction 25A parallel to the polarization direction 26 of the second radiating element 22 is less likely to propagate in the direction from the first radiating element 21 to the second radiating element 22. Therefore, the second radiating element 22 is less likely to be affected by the radio wave in the polarization direction 25A radiated from the first radiating element 21. Therefore, even when the higher harmonic wave of the first frequency f1 overlaps with the frequency band in which the second radiating element 22 operates, the second radiating element 22 is less likely to be affected by higher harmonic components of the radio wave in the polarization direction 25A radiated from the first radiating element 21.

As described above, the second radiating element 22 is less likely to be affected by the radio wave radiated from the first radiating element 21 regardless of the polarization direction of the radio wave radiated from the first radiating element 21. As described above, an effect can be obtained that the second radiating element 22 for linearly polarized waves in one direction is less likely to be affected by radio waves radiated from the first radiating element 21 for both polarized waves. The frequency of the radio wave radiated from the second radiating element 22 operating at a relatively high-frequency is less likely to affect the first radiating element 21 operating at a relatively low-frequency. Therefore, the isolation between the first radiating element 21 and the second radiating element 22 can be improved by adopting the configuration of the antenna device according to the first example.

Further, since the first radiating element 21 is compatible with both polarized waves, stable transmission and reception can be performed without being affected by the posture of the partner antenna on the other side. In addition, transmission and reception can be stably performed without being affected by the posture of the communication equipment in which the antenna device according to the first example is mounted.

Next, a modification of the first example will be described.

In the first example, the plurality of first radiating elements 21 is arranged and also the plurality of second radiating elements 22 is arranged, but one first radiating element 21 and the plurality of second radiating elements 22 may be arranged, the plurality of first radiating elements 21 and one second radiating element 22 may be arranged, or one first radiating element 21 and one second radiating element 22 may be arranged.

Further, a parasitic element may be loaded in at least one of the first radiating element 21 and the second radiating element 22. By loading the parasitic element, it is possible to expand the band width of the frequency for operating by using the multiple resonance. In the first example, the ground conductor 43 is shared by the first radiating element 21 and the second radiating element 22, but the ground conductor for both may be separated from each other.

In the first example, as illustrated in FIG. 2, the second radiating element 22 of the second array antenna 32 performs only one of transmission and reception, but the second radiating element 22 may perform transmission and reception. Further, as illustrated in FIG. 3, the first radiating element 21 of the first array antenna 31 performs both transmission and reception, but may perform only one of transmission and reception.

Next, a specific application example of the antenna device according to the first example will be described.

In this application example, the first radiating element 21 is used as a transmission/reception antenna using the 28 GHz band of a fifth generation mobile communication system, and the second radiating element 22 is used as a transmission/reception antenna for a 60 GHz or 79 GHz millimeter wave radar or a gesture sensor system. At this time, there is a concern that the second radiating element 22 may be affected by radio waves of the second harmonic wave or the third harmonic wave at the first frequency f1 radiated from the first radiating element 21. When the antenna device according to the first example is used, it is possible to reduce the influence of the second harmonic wave or the third harmonic wave radiated from the first radiating element 21 on the second radiating element 22.

In general, an output from a transmission/reception antenna of a fifth generation mobile communication system is larger than an output from a transmission/reception antenna of a millimeter wave radar or a gesture sensor system. That is, the output of the first radiating element 21 is greater than the output of the second radiating element 22. In the first example, since the influence of the radio wave radiated from the first radiating element 21 having a relatively high output on the second radiating element 22 is reduced, and the effect of the first example appears more in this application example.

Second Example

Next, an antenna device according to a second example will be described with reference to FIG. 4A. Hereinafter, description of configurations common to those of the antenna device according to the first example (FIG. 1A, FIG. 1B) will be omitted.

Figure 4A:
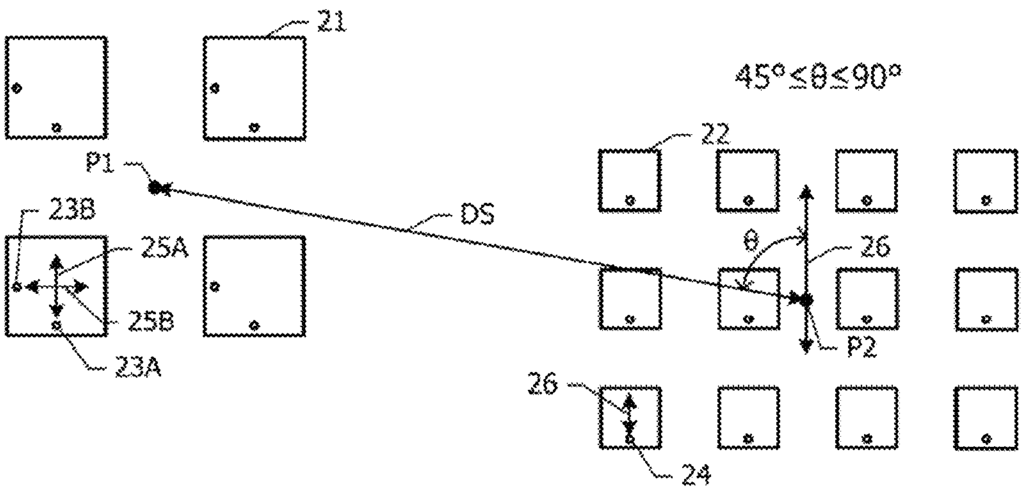
FIG. 4A is a diagram illustrating an arrangement of a plurality of radiating elements of an antenna device according to a second example.

FIG. 4A is a diagram illustrating an arrangement of a plurality of radiating elements of the antenna device according to the second example. In the antenna device according to the first example, a pair of edges of each of the first radiating element 21 and the second radiating element 22 are parallel to the separation direction DS in a plan view. On the other hand, in the second example, the edges of the first radiating element 21 and the second radiating element 22 are parallel to each other in a plan view, but the separation direction DS is inclined with respect to the pair of edges of the first radiating element 21 and the second radiating element 22. The polarization direction 26 of the second radiating element 22 is parallel to a pair of edges of the second radiating element 22 as in the first example. Therefore, the polarization direction 26 of the second radiating element 22 is not orthogonal to the separation direction DS. An angle θ formed by the both is equal to or greater than 45° and equal to or less than 90°. Here, as an angle θ, a smaller angle of angles formed by two straight lines intersecting with each other is adopted.

Next, an effect of the antenna device according to the second example will be described.

By setting the angle θ to be equal to or greater than 45° and equal to or less than 90°, it is possible to reduce the influence of the radio wave radiated from the first radiating element 21 on the second radiating element 22 regardless of the polarization direction of the radio wave radiated from the first radiating element 21, compared to a case where the angle θ is equal to or greater than 0° and less than 45°.

Next, an antenna device according to a modification of the second example will be described with reference to FIG. 4B.

Figure 4B:
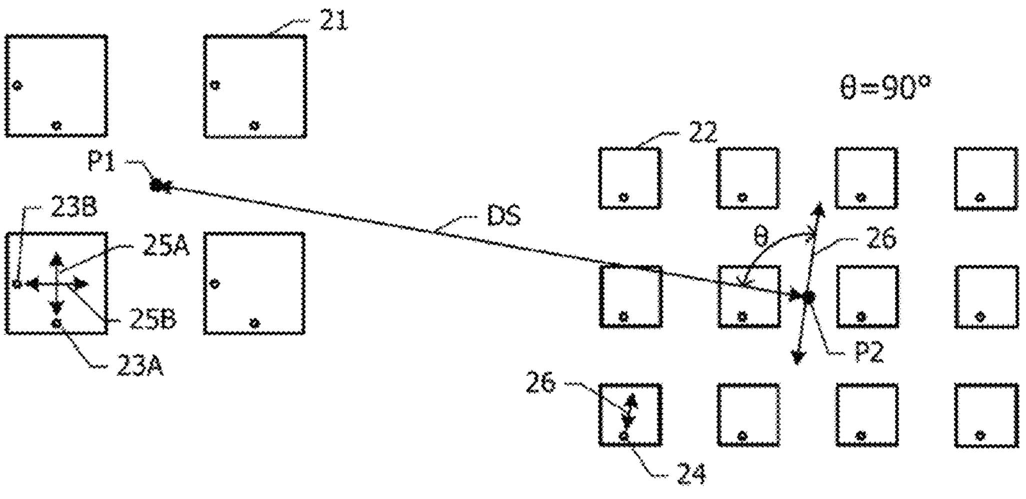
FIG. 4B is a diagram illustrating an arrangement of a plurality of radiating elements of an antenna device according to a modification of the second example.

FIG. 4B is a diagram illustrating an arrangement of a plurality of radiating elements of the antenna device according to the modification of the second example. In the antenna device according to the second example, the polarization direction 26 of the second radiating element 22 is parallel to one edge of the second radiating element 22 in a plan view. On the other hand, in the modification illustrated in FIG. 4B, the polarization direction 26 of the second radiating element 22 is set obliquely with respect to a pair of edges of the second radiating element 22 in a plan view, and is orthogonal to the separation direction DS. That is, a straight line connecting each of the geometric center position of the second radiating elements 22 and the feeding point 24 is inclined with respect to the edge of the second radiating element 22. The position of the feeding point 24 is designed such that the polarization direction 26 is orthogonal to the separation direction DS.

Also in this modification, similarly to the case of the first example, it is possible to reduce the influence of the radio wave radiated from the first radiating element 21 on the second radiating element 22 regardless of the polarization direction of the radio wave radiated from the first radiating element 21.

Third Example

Next, an antenna device according to a third example will be described with reference to FIG. 5. Hereinafter, description of configurations common to those of the antenna device according to the first example (FIG. 1A, FIG. 1B) will be omitted.

Figure 5:
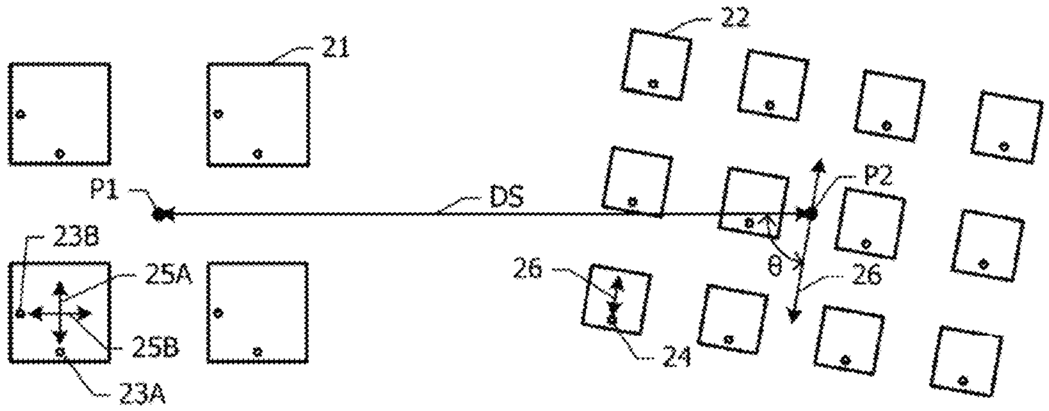
FIG. 5 is a diagram illustrating an arrangement of a plurality of radiating elements of an antenna device according to a third example.

FIG. 5 is a diagram illustrating an arrangement of a plurality of radiating elements of the antenna device according to the third example. In the antenna device (FIG. 1A) according to the first example, a pair of edges of each of the first radiating element 21 and the second radiating element 22 is parallel to the separation direction DS in a plan view. On the other hand, in the third example, in a plan view, a pair of edges of each of the first radiating elements 21 are parallel to the separation direction DS, but a pair of edges of each of the second radiating elements 22 are inclined with respect to the separation direction DS.

The positional relationship between the feeding point 24 of the second radiating element 22 and the outer shape of the second radiating element 22 is the same as that in the first example. Therefore, the polarization direction 26 of the second radiating element 22 is inclined with respect to the separation direction DS. The angle θ formed by the polarization direction 26 of the second radiating element 22 and the separation direction DS is equal to or greater than 45° and equal to or less than 90°. Note that when the angle θ is 90°, the antenna device has the same configuration as that of the antenna device according to the first example.

Next, an effect of the antenna device according to the third example will be described.

In the third example, compared to the case where the angle θ is equal to or greater than 0° and less than 45°, it is possible to reduce the influence of the radio wave radiated from the first radiating element 21 on the second radiating element 22 regardless of the polarization direction of the radio wave radiated from the first radiating element 21.

Next, a modification of the third example will be described.

In the third example, a pair of edges of the first radiating element 21 and the separation direction DS are parallel to each other in a plan view, but a pair of edges of the first radiating element 21 may be inclined with respect to the separation direction DS.

Fourth Example

Next, an antenna device according to a fourth example will be described with reference to FIG. 6A. Hereinafter, description of configurations common to those of the antenna device according to the first example (FIG. 1A, FIG. 1B) will be omitted.

Figure 6A:
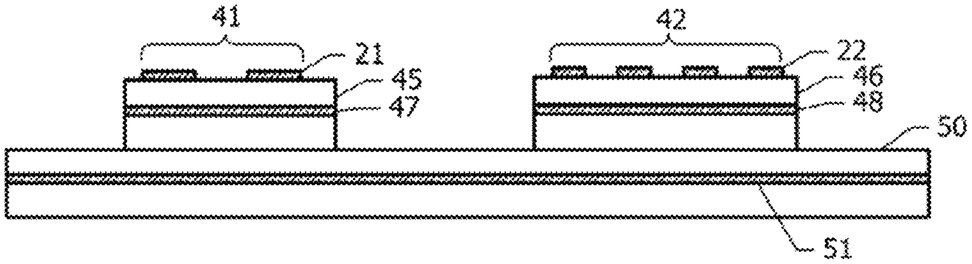
FIG. 6A is a cross-sectional view of an antenna device according to a fourth example.

FIG. 6A is a cross-sectional view of the antenna device according to the fourth example. In the first example, the first radiating element 21 and the second radiating element 22 are formed on the common substrate 40 (FIG. 1B). On the other hand, in the fourth example, the first radiating element 21 is formed in the first region 41 on the surface of a first substrate 45, and the second radiating element 22 is formed in the second region 42 on the surface of a second substrate 46. A ground conductor 47 arranged in an inner layer of the first substrate 45 and the first radiating element 21 configure a patch antenna. A ground conductor 48 provided in an inner layer of the second substrate 46 and the second radiating element 22 configure a patch antenna.

The first substrate 45 and the second substrate 46 are mounted on a common member 50. The first substrate 45, the second substrate 46, and the common member 50 function as support members that support the first radiating element 21 and the second radiating element 22. The common member 50 is, for example, a module substrate and the like. A ground conductor 51 is provided inside the common member 50. The ground conductor 51 is connected to the ground conductor 47 in the first substrate 45 and the ground conductor 48 in the second substrate 46. The first region 41 and the second region 42 are located on the same plane. That is, the height of the first region 41 and the height of the second region 42 with respect to the common member 50 are the same. The positional relationship between the first radiating element 21 and the second radiating element 22 in a plan view is the same as that in the first example (FIG. 1A).

Next, an effect of the antenna device according to the fourth example will be described.

Also in the fourth example, similarly to the first example, an effect that the second radiating element 22 is hardly affected by the radio wave radiated from the first radiating element 21 and propagates in the direction of the second radiating element 22 can be obtained.

Next, an antenna device according to a modification of the fourth example will be described with reference to FIG. 6B.

Figure 6B:
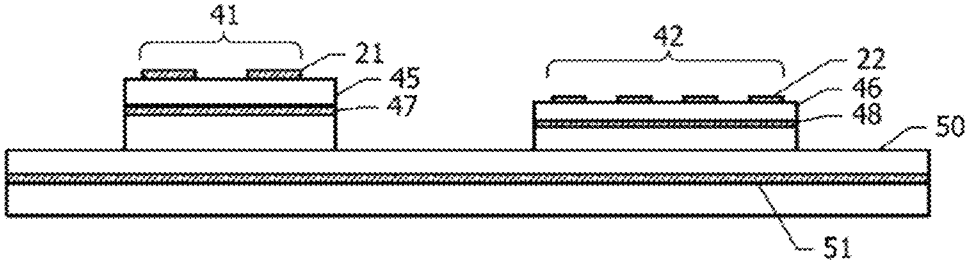
FIG. 6B is a cross-sectional view of an antenna device according to a modification of the fourth example.

FIG. 6B is a cross-sectional view of the antenna device according to the modification of the fourth example. In the fourth example (FIG. 6A), the first region 41 and the second region 42 are located on the same plane. That is, the height of the first region 41 and the height of the second region 42 with respect to the common member 50 are the same. In contrast, in the modification illustrated in FIG. 6B, the height of the first region 41 and the height of the second region 42 are different from each other with respect to the common member 50. Note that the first region 41 and the second region 42 are parallel to each other. Even in a case where the first region 41 and the second region 42 are not located on the same plane as in the modification illustrated in FIG. 6B, similarly to the case of the fourth example, it is possible to obtain an effect that the second radiating element 22 is less likely to be affected by the radio wave radiated from the first radiating element 21 and propagating in the direction of the second radiating element 22.

Fifth Example

Next, an antenna device according to a fifth example will be described with reference to FIG. 7A and FIG. 7B. Hereinafter, description of configurations common to those of the antenna device according to the first example (FIG. 1A, FIG. 1B) will be omitted.

Figure 7A:
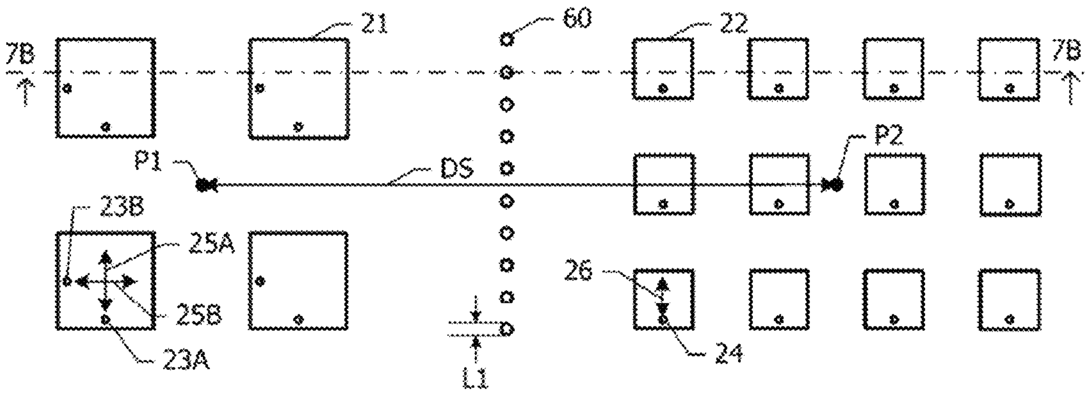
FIG. 7A is a diagram illustrating an arrangement of a plurality of radiating elements and conductive members of the antenna device according to a fifth example.
Figure 7B:
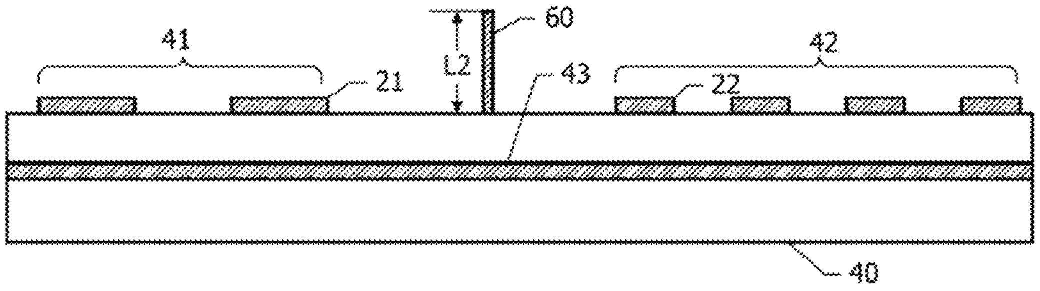
FIG. 7B is a cross-sectional view taken along a dashed-dotted line 7B-7B of FIG. 7A.

FIG. 7A is a diagram illustrating an arrangement of a plurality of radiating elements and conductive members of the antenna device according to the fifth example, and FIG. 7B is a cross-sectional view taken along a dashed-dotted line 7B-7B of FIG. 7A. A plurality of conductive members 60 is arranged between a region where the plurality of first radiating elements 21 is arranged and a region where the plurality of second radiating elements 22 is arranged. The plurality of conductive members 60 is arrayed in a direction orthogonal to the separation direction DS in a plan view. A dimension (height) L2 of the conductive member 60 in a direction orthogonal to the first region 41 is larger than a dimension (width) L1 thereof in a direction parallel to the polarization direction 26 of the second radiating element 22. For example, each of the conductive members 60 has a columnar or prismatic shape, is arranged in a posture perpendicular to the surface of the substrate 40, and is in an electrically floating state.

The plurality of conductive members 60 prevents propagation of radio waves having electric field components perpendicular to the first region 41 and the second region 42, and is substantially electrically transparent to radio waves having electric field components parallel to the polarization direction 26. Note that "electrically transparent" means that the influence on radio waves is substantially equivalent to that of air.

Next, an effect of the antenna device according to the fifth example will be described.

When radio waves in the polarization direction 25B radiated from the first radiating element 21 propagates in the separation direction DS, electric field components perpendicular to the first region 41 are dominant at the position where the conductive members 60 are arranged. Therefore, most of the radio waves in the polarization direction 25B from the first radiating element 21 toward the second radiating element 22 are shielded by the conductive members 60. Therefore, it is possible to further reduce the influence of higher harmonic components of radio waves in the polarization direction 25B radiated from the first radiating element 21 on the second radiating element 22.

In order to efficiently shield radio waves in the operating frequency band of the second radiating element 22, it is preferable that the height L2 of each of the conductive members 60 be equal to or more than ½ of the wave length corresponding to the second frequency f2 at which the second radiating element 22 operates. In addition, an array period (pitch) of the plurality of conductive members 60 is preferably equal to or less than ½, and more preferably equal to or less than ¼ of the wave length corresponding to the second frequency f2.

Further, when the radio wave in the polarization direction 26 radiated from the second radiating element 22 propagates in the separation direction DS, electric field components parallel to the second region 42 are dominant at the position where the conductive members 60 are arranged. Therefore, the conductive member 60 does not interfere with propagation of radio waves radiated from the second radiating element 22.

Next, a first modification of the fifth example will be described with reference to FIG. 8.

Figure 8:
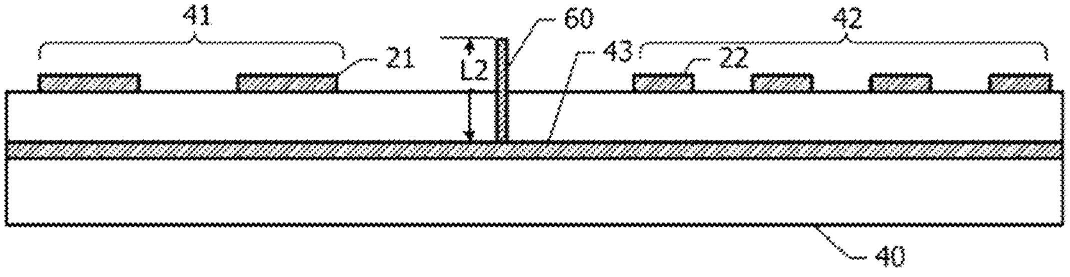
FIG. 8 is a cross-sectional view of an antenna device according to a first modification of the fifth example.

FIG. 8 is a cross-sectional view of an antenna device according to the first modification of the fifth example. In the fifth example, the conductive member 60 is brought into an electrically floating state. In contrast, in the first modification of the fifth example, the conductive member 60 is embedded in a surface layer portion of the substrate 40 and connected to the ground conductor 43.

Also in the first modification of the fifth example, similarly to the fifth example, it is possible to reduce the influence on the second radiating element 22 by the radio wave in the polarization direction 25B radiated from the first radiating element 21. In the first modification of the fifth example, since the conductive member 60 is connected to the ground conductor 43, a sufficient effect of shielding radio waves can be obtained even when the height L2 of the conductive member 60 is lower than that in the fifth example. For example, the height L2 of the conductive member 60 is preferably equal to or more than ¼ of the wave length corresponding to the second frequency f2 at which the second radiating element 22 operates.

Next, a second modification of the fifth example will be described with reference to FIG. 9A and FIG. 9B.

Figure 9A:
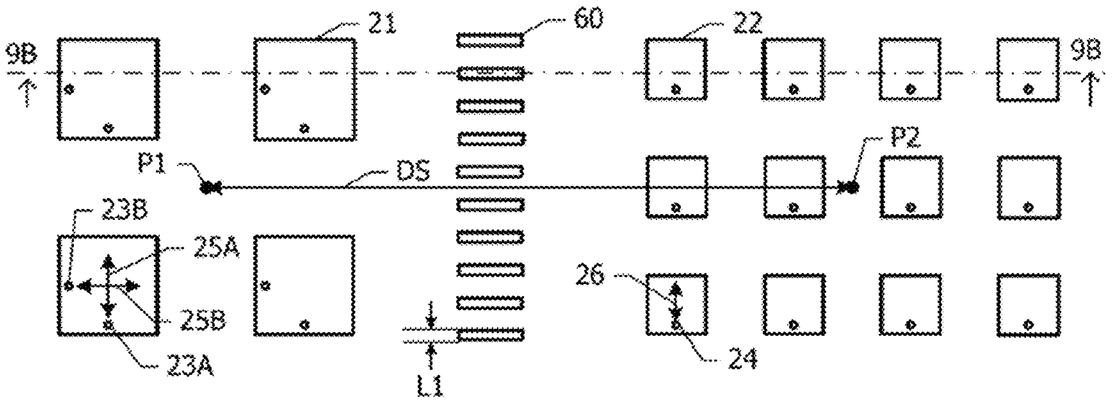
FIG. 9A is a diagram illustrating an arrangement of a plurality of radiating elements and conductive members of an antenna device according to a second modification of the fifth example.
Figure 9B:
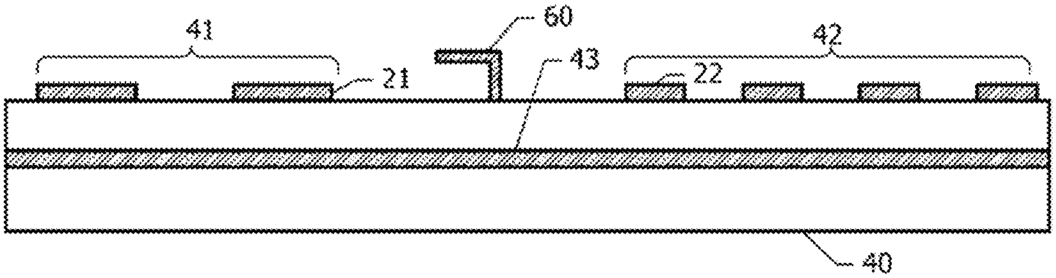
FIG. 9B is a cross-sectional view taken along a dashed-dotted line 9B-9B of FIG. 9A.

FIG. 9A is a diagram illustrating an arrangement of a plurality of radiating elements and conductive members of an antenna device according to the second modification of the fifth example, and FIG. 9B is a cross-sectional view taken along a dashed-dotted line 9B-9B of FIG. 9A.

In the fifth example, each of the conductive members 60 has a cylindrical shape or a prismatic shape, for example, and is arranged in a posture perpendicular to the surface of the substrate 40. On the other hand, in the second modification of the fifth example, each of the conductive members 60 has a shape bent in an L-shape. One linear portion is held in a posture perpendicular to the surface of the substrate 40 with the bent portion as a boundary, and the other linear portion is held in a posture parallel to the separation direction DS.

In the second modification of the fifth example, when a space for arranging the conductive member 60 having a sufficient height cannot be secured, the conductive member 60 is bent into an L-shape, whereby a sufficient electrical length of the conductive member 60 can be secured. The length of the conductive member 60 is preferably equal to or more than ½ of the wave length corresponding to the second frequency f2 at which the second radiating element 22 operates. Further, since a distal end portion from the bent portion is parallel to the separation direction DS, the dimension L1 of the conductive member 60 in the direction orthogonal to the separation direction DS is substantially the same as that in the fifth example (FIG. 7A). Therefore, the plurality of conductive members 60 is substantially electrically transparent to the radio waves radiated from the second radiating element 22.

Sixth Example

Next, a communication device according to a sixth example will be described with reference to FIG. 10A.

Figure 10A:
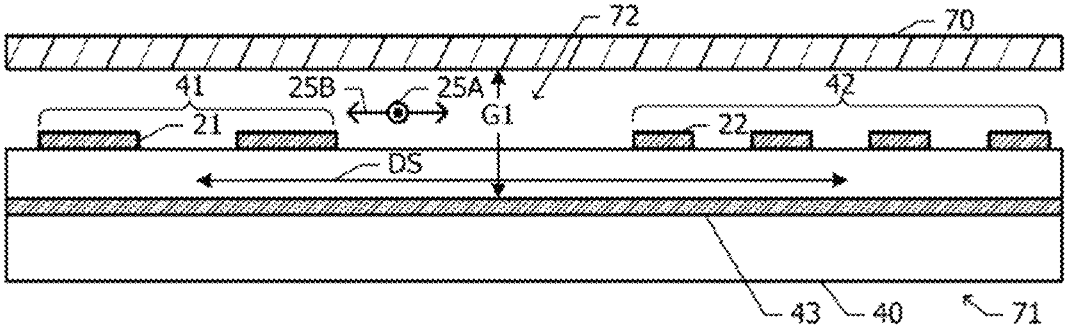
FIG. 10A is a cross-sectional view of a communication device according to a sixth example.

FIG. 10A is a cross-sectional view of the communication device according to the sixth example. The communication device according to the sixth example includes a housing 70 and an antenna device 71 housed in the housing 70. A part of the housing 70 is illustrated in FIG. 10A. The antenna device according to the first example (FIG. 1A, FIG. 1B) is used as the antenna device 71. The housing 70 is formed of a dielectric material and is, for example, a housing of a portable communication terminal such as a smartphone. A wall surface of the housing 70 faces the first region 41 and the second region 42 of the antenna device 71 with a gap 72 interposed therebetween.

In the antenna device according to the first example, the configuration is adopted by which an influence on the second radiating element 22 by radio waves in the polarization direction 25B that are radiated from the first radiating element 21, propagate on the surface of the substrate 40, and reach the second radiating element 22 is reduced. In the case where the gap 72 is formed between the substrate 40 and the housing 70 as in the sixth example, the gap 72 or the space between the ground conductor 43 inside the substrate 40 and the housing 70 functions as a waveguide, and propagation of radio waves in a waveguide mode may occur. For example, among radio waves radiated from the first radiating element 21, radio waves in the polarization direction 25A orthogonal to the separation direction DS may propagate in the separation direction DS through the gap 72 or a space between the ground conductor 43 inside the substrate 40 and the housing 70. In the sixth example, a configuration for suppressing propagation of radio waves in the waveguide mode is adopted.

To be specific, an interval G1 between the ground conductor 43 inside the substrate 40 and the housing 70 is set to be equal to or less than ½ of the wave length corresponding to the second frequency f2 at which the second radiating element 22 operates. With this configuration, propagation of the radio wave in the waveguide mode at the second frequency f2 of the second radiating element 22 is suppressed.

Next, an effect of the communication device according to the sixth example will be described.

In the sixth example, since propagation of the radio wave in the waveguide mode at the second frequency f2 at which the second radiating element 22 operates is suppressed, influence on the second radiating element 22 by the radio wave at a frequency overlapping with the operating frequency band of the second radiating element 22 among radio waves of higher harmonic waves of the first frequency f1 radiated from the first radiating element 21 is reduced.

Figure 10B:
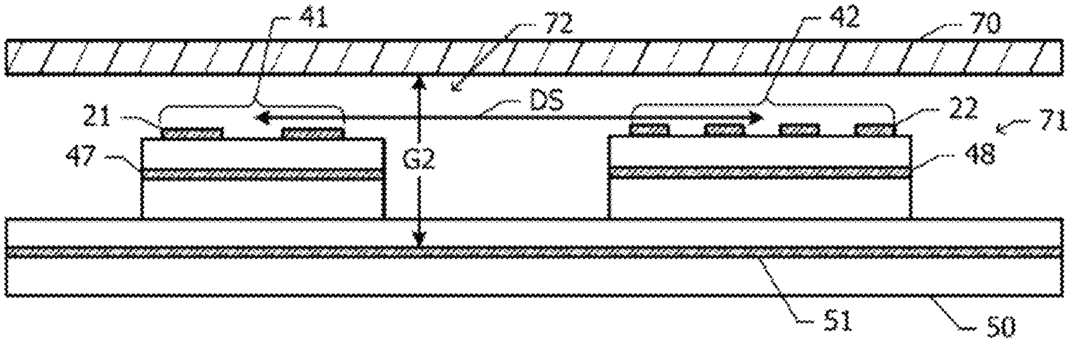
FIG. 10B and FIG. 10C are cross-sectional views of a communication device according to a modification of the sixth example.
Figure 10C:
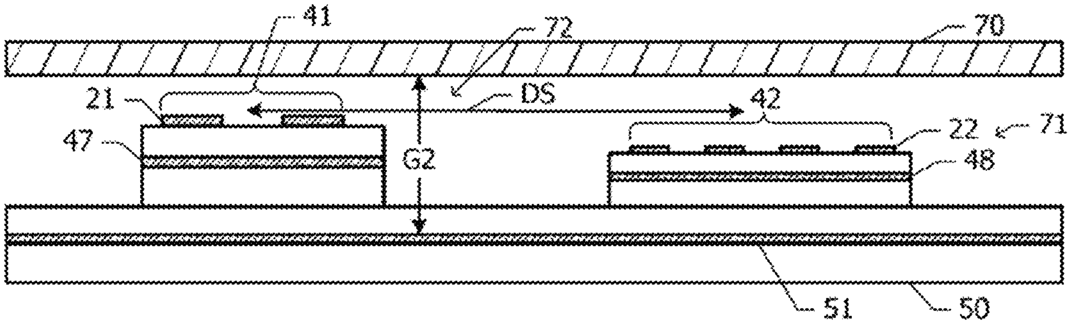

Next, a communication device according to a modification of the sixth example will be described with reference to FIG. 10B and FIG. 10C. FIG. 10B and FIG. 10C are a cross-sectional view of the communication device according to the modification of the sixth example.

In the communication device according to the sixth example, the antenna device (FIG. 1A, FIG. 1B) according to the first example is used as the antenna device 71. On the other hand, in the modifications illustrated in FIG. 10B and FIG. 10C, the antenna device (FIG. 6A) according to the fourth example and the antenna device (FIG. 6B) according to the modification of the fourth example are used, respectively. In this configuration, the ground conductors 47 and 48 functioning as an antenna ground are not arranged between the first region 41 and the second region 42 in a plan view, but the ground conductor 51 is arranged therebetween. Therefore, the space between the ground conductor 51 inside the common member 50 and the housing 70 mainly functions as a waveguide. In both of the modifications of FIG. 10B and FIG. 10C, an interval G2 from the ground conductor 51 arranged between the first region 41 and the second region 42 to the housing 70 in a plan view is set to be equal to or less than ½ of the wave length corresponding to the second frequency f2 at which the second radiating element 22 operates. In these modifications as well, propagation of radio waves in the waveguide mode can be suppressed.

Seventh Example

Next, a communication device according to a seventh example will be described with reference to FIG. 11A.

Figure 11A:
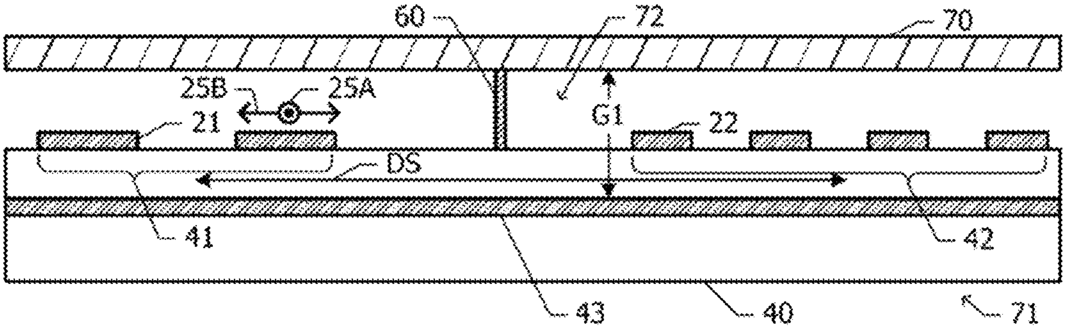
FIG. 11A is a cross-sectional view of a communication device according to a seventh example.

FIG. 11A is a cross-sectional view of the communication device according to the seventh example. The communication device according to the seventh example includes the housing 70 and the antenna device 71 housed in the housing 70. The antenna device according to the fifth example (FIG. 7A, FIG. 7B) is used as the antenna device 71. A wall surface of the housing 70 faces the first region 41 and the second region 42 of the antenna device 71 with a gap 72 interposed therebetween. A tip of the conductive member 60 provided in the antenna device 71 is in contact with the housing 70. As in the case of the communication device (FIG. 10A) according to the sixth example, the interval G1 from the ground conductor 43 inside the substrate 40 to the housing 70 is set to be equal to or less than ½ of the wave length corresponding to the second frequency f2 at which the second radiating element 22 operates.

Next, an effect of the antenna device according to the seventh example will be described.

In the seventh example, since the antenna device (FIG. 7A, FIG. 7B) according to the fifth example is used as the antenna device 71, similarly to the antenna device (FIG. 7A, FIG. 7B) according to the fifth example, it is possible to further reduce the influence on the second radiating elements 22 by the radio wave in the polarization direction 25B radiated from the first radiating element 21. Further, since the interval G1 is set to be equal to or less than ½ of the wave length corresponding to the operating frequency of the second radiating element 22, the influence on the second radiating element 22 by the radio wave of a frequency overlapping with the operating frequency band of the second radiating element 22 among higher harmonic components of the radio wave of the first frequency f1 radiated from the first radiating element 21 is reduced as in the communication device according to the sixth example.

Next, a communication device according to a modification of the seventh example will be described with reference to FIG. 11B.

Figure 11B:
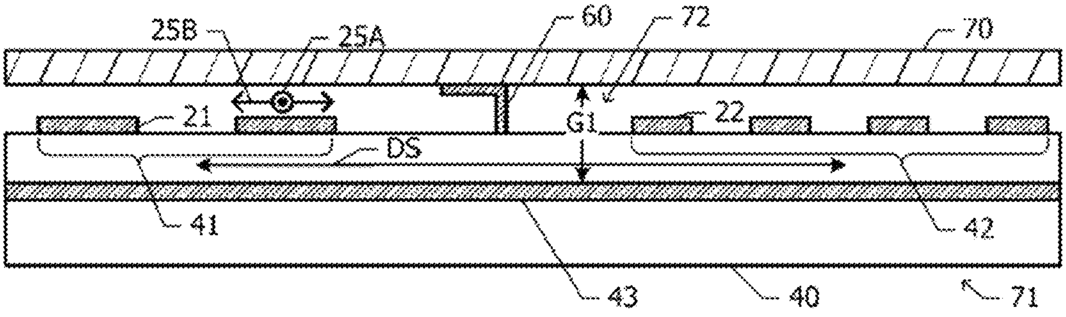
FIG. 11B is a cross-sectional view of a communication device according to a modification of the seventh example.

FIG. 11B is a cross-sectional view of the communication device according to the modification of the seventh example. In this modification, the conductive member 60 is bent into an L-shape similarly to the antenna device according to the second modification of the fifth example (FIG. 9A and FIG. 9B). A distal end portion from the bent portion of the conductive member 60 is in contact with the housing 70. In this modification, since the conductive member 60 is bent in an L-shape, it is possible to further reduce the interval from the first region 41 and the second region 42 of the antenna device 71 to the housing 70. In other words, the interval G1 can be made narrower. As the interval G1 becomes narrower, the frequency of the radio waves in the waveguide mode that can propagate through the space between the ground conductor 43 and the housing 70 becomes higher. That is, the cutoff frequency of the waveguide formed by the space between the ground conductor 43 and the housing 70 becomes higher. As a result, it is possible to further increase the second frequency f2 at which the second radiating element 22 operates while maintaining the effect of reducing the influence by the radio wave of higher harmonic components radiated from the first radiating element 21 on the second radiating element 22.

Next, another modification of the seventh example will be described. In the communication device according to the seventh example, though the conductive member 60 is fixed to the substrate 40 of the antenna device 71, the conductive member 60 may be fixed to the housing 70 in advance. The conductive member 60 can be arranged between the region where the first radiating element 21 is arranged and the region where the second radiating element 22 is arranged by positioning the antenna device 71 and the housing 70 when the antenna device 71 is housed in the housing 70. In a state where the antenna device 71 is housed in the housing 70, the tip of the conductive member 60 comes into contact with the surface of the substrate 40.

Eighth Example

Figure 12A:
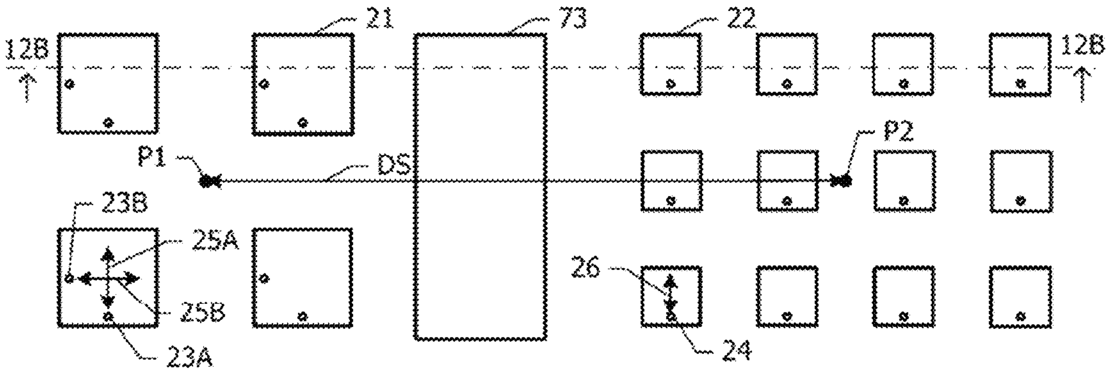
FIG. 12A is a diagram illustrating a positional relationship in a plan view between a plurality of radiating elements of an antenna device mounted on a communication device according to an eighth example and a metal strip provided on a housing of the communication device.
Figure 12B:
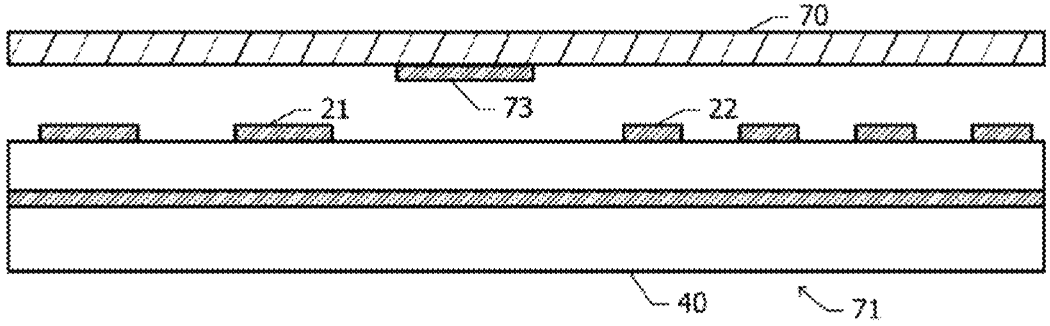
FIG. 12B is a cross-sectional view taken along a dashed-dotted line 12B-12B of FIG. 12A.

Next, a communication device according to an eighth example will be described with reference to FIG. 12A and FIG. 12B. FIG. 12A is a diagram illustrating a positional relationship in a plan view between a plurality of radiating elements of the antenna device 71 mounted in the communication device according to the eighth example and a metal strip 73 provided at the housing 70 of the communication device, and FIG. 12B is a cross-sectional view taken along a dashed-dotted line 12B-12B of FIG. 12A.

The communication device according to the eighth example includes the housing 70 and the antenna device 71 housed in the housing 70. As the antenna device 71, for example, the antenna device according to the first example (FIG. 1A, FIG. 1B) is used. In a plan view, the metal strip 73 is arranged between the region where the first radiating element 21 is arranged and the region where the second radiating element 22 is arranged. The metal strip 73 is provided on a surface of the housing 70 facing the antenna device 71. Note that in a plan view, the metal strip 73 does not overlap with any of the first radiating element 21 and the second radiating element 22.

Next, an effect of the communication device according to the eighth example will be described with reference to FIG. 12B and FIG. 13.

Figure 13:
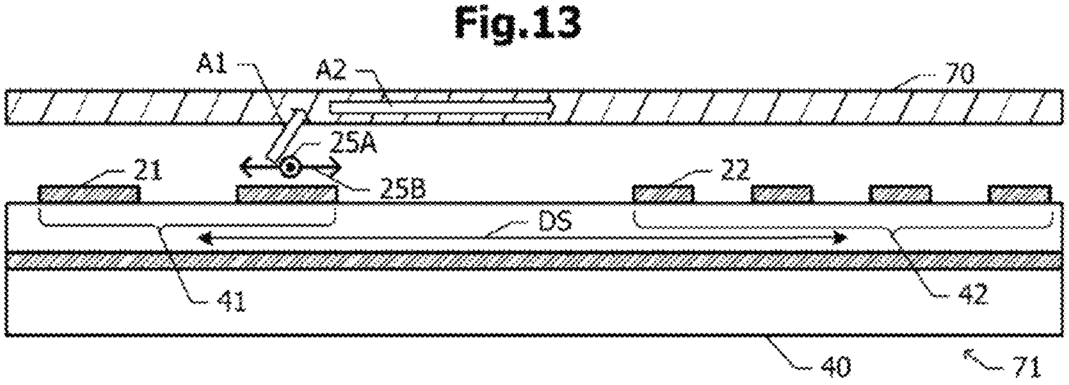
FIG. 13 is a cross-sectional view of a communication device in which the metal strip (FIG. 12B) is not provided.

FIG. 13 is a cross-sectional view of a communication device in which the metal strip 73 (FIG. 12B) is not provided. When a radio wave of a higher harmonic wave in the polarization direction 25A radiated from the first radiating element 21 enters the wall of the housing 70 (arrow A1), a propagation mode (arrow A2) is generated in which the radio wave propagates in the separation direction DS in the wall of the housing 70. When the higher harmonic components of the radio wave in the propagation mode propagating through the wall of the housing 70 reach the region where the second radiating element 22 is arranged, the higher harmonic components become noise with respect to the reception signal of the second radiating element 22.

In the eighth example, the metal strip 73 provided on an inner surface of the housing 70 suppresses propagation of radio waves propagating in the wall. Therefore, it is possible to reduce the influence of the higher harmonic components of the radio wave radiated from the first radiating element 21 on the second radiating element 22. In order to obtain a sufficient effect of suppressing propagation of radio waves propagating in the wall, it is preferable that the metal strip 73 include a plurality of second radiating elements 22 with respect to the polarization direction 26 of the second radiating element 22.

Next, a modification of the eighth example will be described with reference to FIG. 14A and FIG. 14B.

Figure 14A:
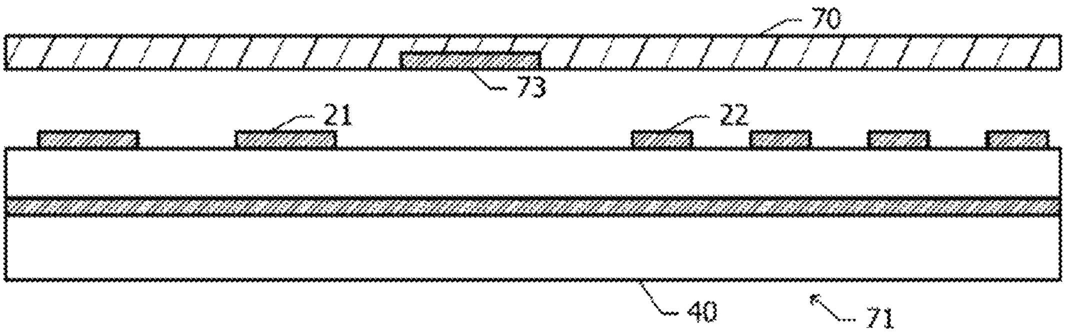
FIG. 14A and FIG. 14B are cross-sectional views of a communication device according to a modification of the eighth example.
Figure 14B:
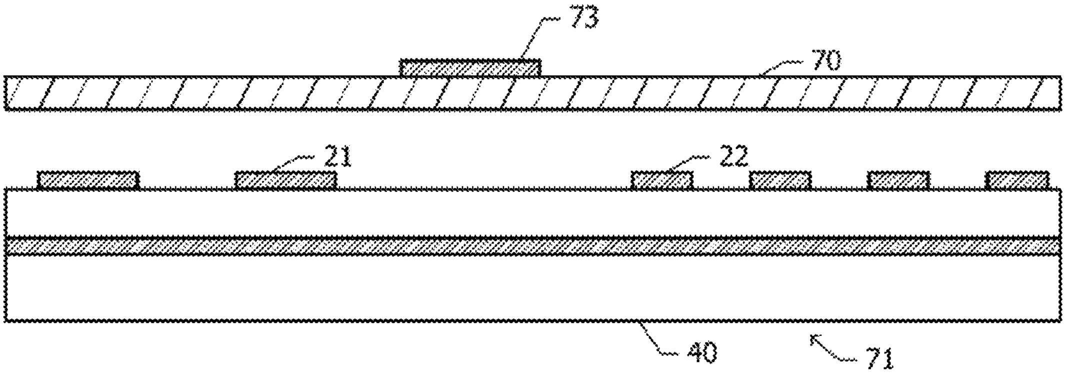

FIG. 14A and FIG. 14B are a cross-sectional view of an antenna device according to the modification of the eighth example. In the eighth example, the metal strip 73 (FIG. 12B) is attached to the inner surface of the housing 70. On the other hand, in the modification illustrated in FIG. 14A, the metal strip 73 is embedded inside the housing 70 from the inner surface thereof. In the modification illustrated in FIG. 14B, the metal strip 73 is attached to a surface of an outer side portion of the housing 70.

As in these modifications, the metal strip 73 may be arranged on any of the inner surface, the surface of the outer side portion, or the inside of the housing 70.

Ninth Example

Next, a communication device according to a ninth example will be described with reference to FIG. 15A, FIG. 15B, and FIG. 15C. Hereinafter, description of configurations common to those of the antenna device according to the first example (FIG. 1A to FIG. 3) will be omitted.

Figure 15A:
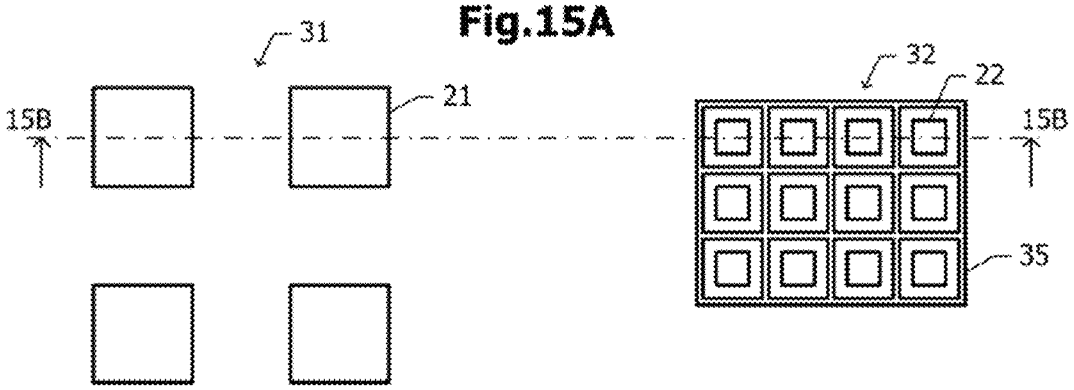
FIG. 15A is a plan view of an antenna device mounted on a communication device according to a ninth example.
Figure 15B:
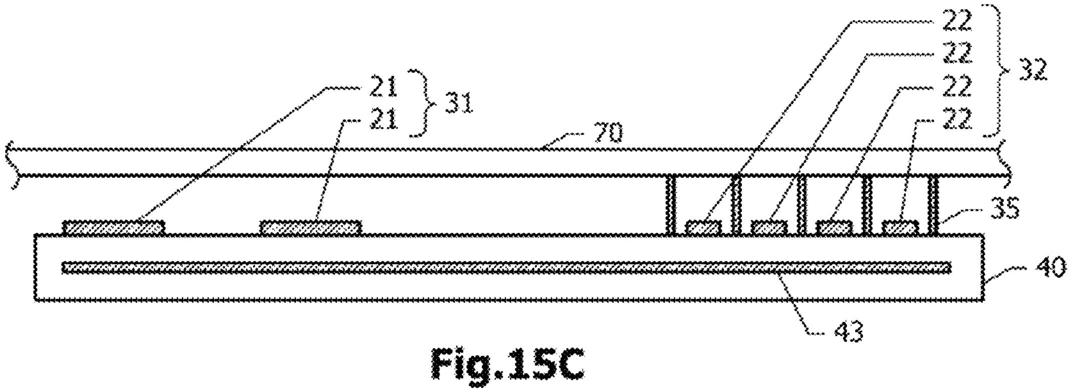
FIG. 15B is a cross-sectional view taken along a dashed-dotted line 15B-15B of FIG. 15A.
Figure 15C:
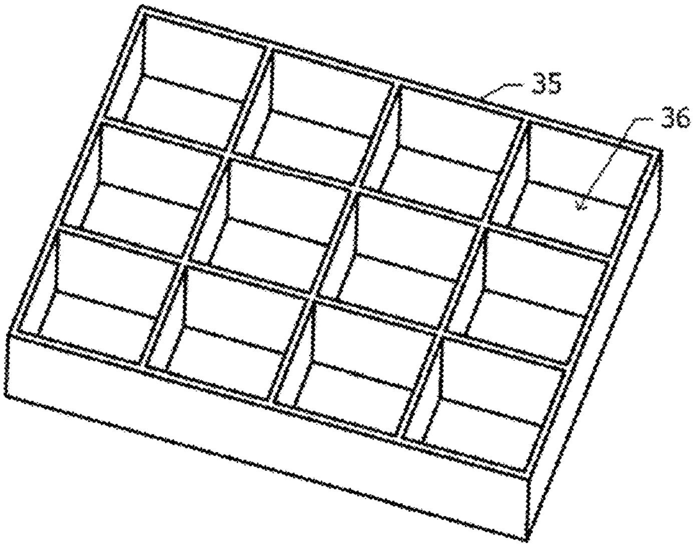
FIG. 15C is a perspective view of a waveguide structure included in the communication device according to the ninth example.

FIG. 15A is a plan view of an antenna device mounted on the communication device according to the ninth example. FIG. 15B is a cross-sectional view taken along a dashed-dotted line 15B-15B of FIG. 15A. FIG. 15C is a perspective view of a waveguide structure included in the communication device according to the ninth example.

The communication device according to the ninth example includes the substrate 40, the first array antenna 31, and the second array antenna 32. These configurations are the same as those of the antenna device (FIG. 1A, FIG. 1B) according to the first example. The communication device according to the ninth example further includes the housing 70 and a waveguide structure 35.

A portion of the housing 70 faces a surface (hereinafter, referred to as an "upper surface") of the substrate 40 on which the first array antenna 31 and the second array antenna 32 are arranged with a gap therebetween. The waveguide structure 35 is arranged between the upper surface of the substrate 40 and the housing 70. The waveguide structure 35 is in contact with both the substrate 40 and the housing 70. For example, the waveguide structure 35 is arranged at an outer side portion of the range of the half-value angle of the main beam when viewed from the first array antenna 31 and in the path of the radio wave received by the second array antenna 32. The waveguide structure 35 is preferably arranged so as not to overlap with the first array antenna 31 in a plan view and so as to include the second array antenna 32.

The waveguide structure 35 (FIG. 15C) includes metal walls arranged in a lattice-shape in a plan view. The plurality of second radiating elements 22 of the second array antenna 32 is arranged corresponding to a plurality of cavities 36 of the lattice-shaped metal wall. Specifically, each of the second radiating elements 22 is arranged inside the corresponding cavity 36 in a plan view. The relative positional relationship between the second radiating element 22 and the corresponding cavity 36 is the same for all of the second radiating elements 22.

In the lattice-shaped metal wall, a portion serving as a side wall of each of the plurality of cavities 36 functions as one waveguide (hereinafter, referred to as a unit waveguide) and allows a radio wave having a desired wave length to pass therethrough. In addition, the waveguide structure 35 functions as a reflector for radio waves having a wave length sufficiently longer relative to the dimension of the cavity 36. Specifically, the waveguide structure 35 allows radio waves of the operating frequency of the second array antenna 32 to pass therethrough, and attenuates radio waves of the operating frequency of the first array antenna 31 more than the radio waves of the operating frequency of the second array antenna 32.

Next, an effect of the ninth example will be described with reference to FIG. 16.

Figure 16:
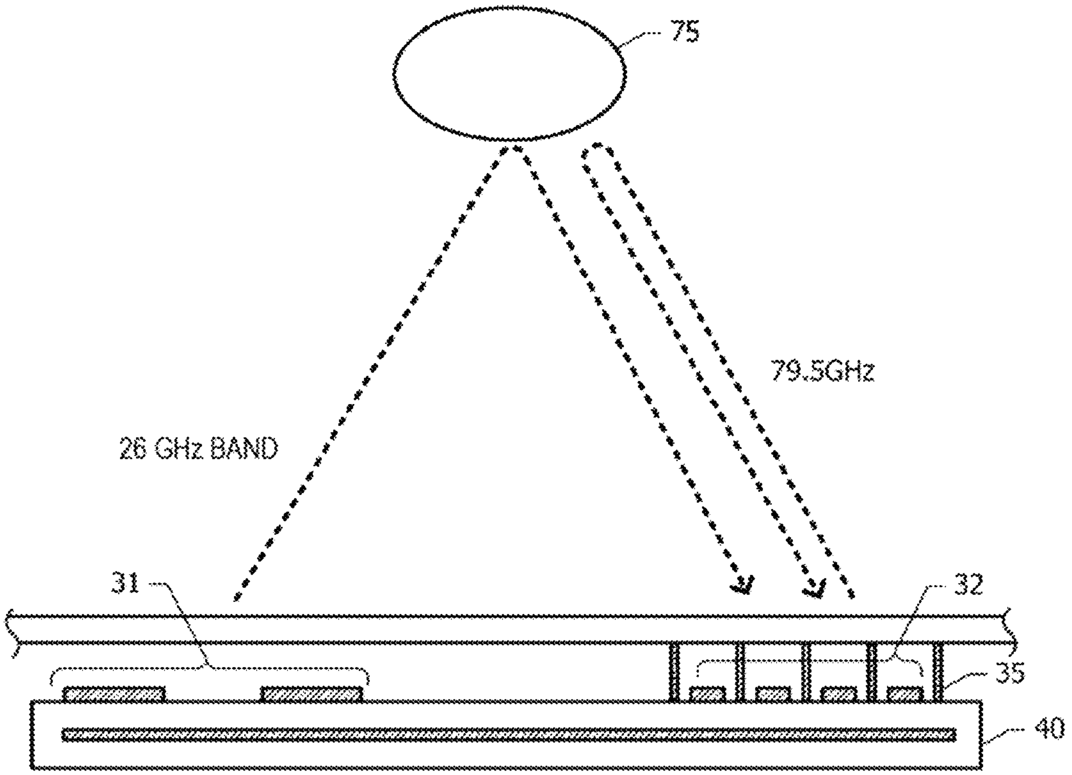
FIG. 16 is a schematic diagram of a communication device and a radio wave reflector existing in a radio wave radiation space of the communication device according to the ninth example.

FIG. 16 is a schematic diagram of a communication device according to the ninth example and a radio wave reflector existing in a radio wave radiation space of the communication device. A radio wave reflector 75 is present in a space where radio waves of the first array antenna 31 and the second array antenna 32 are radiated. The first array antenna 31 is used in, for example, a fifth generation mobile communication system (5G communication system) and operates in a 26 GHz band. The second array antenna 32 is used in, for example, a millimeter wave radar or a gesture sensor system, and has an operating frequency of 79.5 GHz.

The waveguide structure 35 allows almost all the radio waves of 79.5 GHz, which is the operating frequency of the second array antenna 32, to pass therethrough, and greatly attenuates the radio waves in the operating frequency band of the first array antenna 31. A radio wave radiated from the second array antenna 32 is reflected by the radio wave reflector 75, and a reflected wave is received by the second array antenna 32.

A radio wave radiated from the first array antenna 31 is also reflected by the radio wave reflector 75, and a reflected wave enters the second array antenna 32. An antenna gain of the second array antenna 32 is maximum at its operating frequency 79.5 GHz, but has a certain degree of gain in the operating frequency band of the first array antenna 31. For this reason, for example, reflected waves of radio waves in the 26 GHz band are also received by the second array antenna 32. When signals in the 26 GHz band are amplified by the low noise amplifier 87 of the second transmission/reception circuit 34 (FIG. 2), higher harmonic waves are generated due to nonlinearity of the low noise amplifier 87. Third harmonic wave of signals in the 26 GHz band includes signals at a frequency that coincides with a frequency of 79.5 GHz or is close to the frequency of 79.5 GHz. Therefore, the third harmonic wave of the reception signals in the 26 GHz band becomes noise with respect to the signals transmitted and received by the second array antenna 32.

In the ninth example, since the waveguide structure 35 attenuates the radio wave that is radiated from the first array antenna 31, is reflected by the radio wave reflector 75, and enters the second array antenna 32, the intensity of the third harmonic wave generated due to the nonlinearity of the low noise amplifier 87 is also reduced. Therefore, it is possible to reduce the influence of noise caused by the radio wave radiated from the first array antenna 31 and reflected by the radio wave reflector 75 on signals transmitted and received by the second array antenna 32.

Furthermore, in the ninth example, the relative positional relationship between the plurality of second radiating elements 22 of the second array antenna 32 and the corresponding cavities 36 (FIG. 15C) of the waveguide structure 35 is the same for all of the second radiating elements 22. Therefore, it is possible to suppress variations in the antenna gain of the second radiating element 22 alone.

Next, an attenuation amount for the waveguide structure 35 will be described with reference to FIG. 17.

Figure 17:
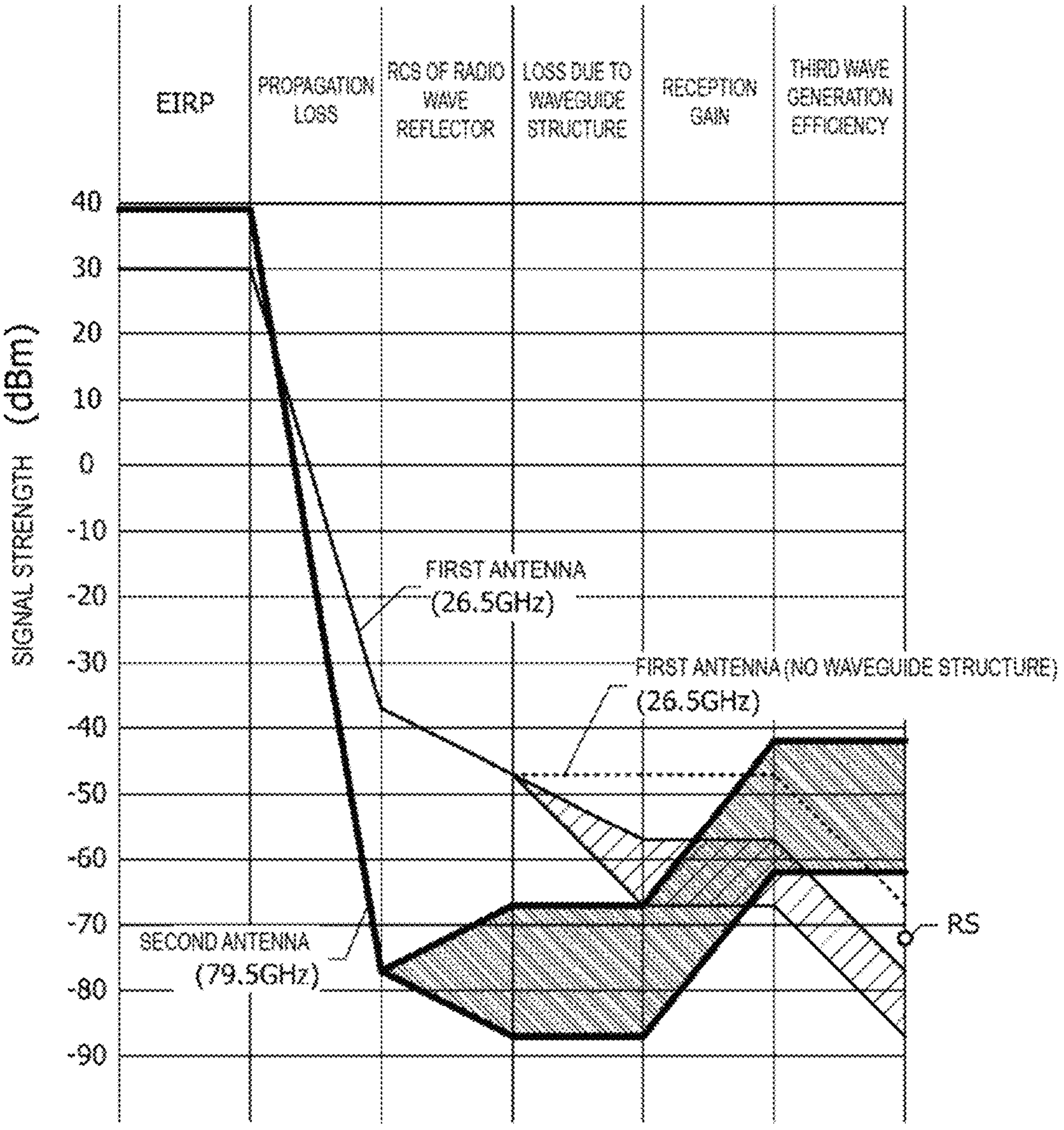
FIG. 17 is a graph illustrating an example of a change in signal strength from when the signal is radiated from a first array antenna and a second array antenna, then the signal is reflected by a radio wave reflector, until the signal is detected by a second transmission/reception circuit.

FIG. 17 is a graph illustrating an example of a change in signal strength from when the signal is radiated from the first array antenna 31 and the second array antenna 32, when the signal is reflected by the radio wave reflector 75 (FIG. 16), to when the signal is detected by the second transmission/reception circuit 34 (FIG. 2). The vertical axis represents signal strength in units of "dBm".

The horizontal axis represents the equivalent isotropic radiated power (EIRP) of the antenna, factors causing variation in signal strength, that is, the propagation loss of radio waves, the loss caused by the radar scattering cross section (RCS) of radio wave reflectors, the propagation loss due to the waveguide structure 35 (FIG. 1A, FIG. 1B), the reception gain of the antenna, and the generation efficiency of the third harmonic wave due to the nonlinearity of the low noise amplifier.

FIG. 17 illustrates a case where the second array antenna 32 is for millimeter-wave radar at a frequency of 79.5 GHz and the first array antenna 31 is for transmission and reception in the 26 GHz band of the 5G communication system. A radio wave of 26.5 GHz included in the 26 GHz band is radiated from the first array antenna 31, and a radio wave of 79.5 GHz is radiated from the second array antenna 32. The frequency of the third harmonic wave radiated from the first array antenna 31 is equal to the frequency of the fundamental harmonic wave radiated from the second array antenna 32.

The thick solid line in the graph of FIG. 17 indicates variations in the strength of signals related to the radio wave of 79.5 GHz radiated from the second array antenna 32. The relatively high density hatched area indicates the range of strength of signals related to the radio wave of 79.5 GHz radiated from the second array antenna 32. The thin solid line indicates variations in the strength of signals related to the radio wave of 26.5 GHz radiated from the first array antenna 31. The relatively low density hatched area indicates the range of strength of signals related to the radio wave of 26.5 GHz radiated from the first array antenna 31. The dashed line indicates the strength of signals related to the radio wave of 26.5 GHz radiated from the first array antenna 31 in a case where the waveguide structure 35 is not arranged.

It is assumed that the EIRP of the fundamental harmonic wave of the first array antenna 31 is 30 dBm. At this time, for example, the EIRP of the third harmonic wave is about −4 dBm. The EIRP of the radio wave of 79.5 GHz radiated from the second array antenna 32 used in the radar system is set to be sufficiently higher than the EIRP of the third harmonic wave radiated from the first array antenna 31. For example, the EIRP of the frequency of 79.5 GHz by the second array antenna 32 is set to a sufficiently large 39 dBm relative to −4 dBm.

First, a radar system including the second array antenna 32 will be described. It is assumed that a patch array antenna in which eight traveling-wave-type patch arrays are arranged in parallel is used as the second array antenna 32. In the case where the antenna gain is 25 dBi, the EIRP can be made 39 dBm by making the input power of one port be 5 dBm. When a radio wave reflector away by 100 m is detected, a round-trip distance of the radio wave is 200 m. This propagation loss is about 116 dB. Therefore, the signal strength after propagation loss occurs becomes −77 dBm. Further, assuming that the radar scattering cross section (RCS) of the radio wave reflector is in a range of equal to or greater than −10 dB and equal to or less than +10 dB, the signal strength after considering the RCS of the radio wave reflector is equal to or greater than −87 dBm and equal to or less than −67 dBm.

Since the waveguide structure 35 allows most of the radio wave of 79.5 GHz to pass therethrough, almost no loss is caused by the waveguide structure 35. Therefore, the signal strength after passing through the waveguide structure 35 is equal to or greater than −87 dBm and equal to or less than −67 dBm. Assuming that the reception gain of the second array antenna 32 is 25 dBi, the signal strength of signals received by the second array antenna 32 is equal to or greater than −62 dBm and equal to or less than −42 dBm. Therefore, it is preferable that the reception sensitivity of the second transmission/reception circuit 34 (FIG. 2) be at least lower than −62 dBm. It is preferable to set the reception sensitivity RS to about −72 dBm in consideration of a margin of about 10 dB.

Next, the influence of the radio wave radiated from the first array antenna 31 for the 5G communication system on the radar system will be described. In order to prevent the third harmonic wave of the fundamental harmonic wave of 26.5 GHz radiated from the first array antenna 31 from affecting the radar system, the signal strength of this harmonic wave needs to be lower than the reception sensitivity RS of the radar system, i.e., −72 dBm.

The EIRP of 26.5 GHz by the first array antenna 31 is, for example, 30 dBm as described above. As an example, in a case where the radio wave is radiated from the first array antenna 31 and is reflected by a radio wave reflector located 1 m ahead, and enters the second array antenna 32, the propagation loss in the round-trip of 2 m is approximately 67 dB. For this reason, the signal strength after propagation loss occurs becomes −37 dBm. In the case where the RCS of the obstacle is approximately −10 dB, the signal strength after taking into account the RCS of the obstacle is −47 dBm.

First, a case where the waveguide structure 35 is not arranged will be described. In the case where the reception gain at 79.5 GHz of the second array antenna 32 is 25 dBi, then the reception gain at 26.5 GHz will be lower than that. For example, the reception gain at 26.5 GHz is 0 dBi. At this time, the signal strength of the reception signal of 26.5 GHz received by the second array antenna 32 becomes −47 dBm. Assuming that the third harmonic wave generation efficiency due to the nonlinearity of the low noise amplifier is −20 dB, the signal strength of the third harmonic wave at the frequency of 79.5 GHz after passing through the low noise amplifier is −67 dBm.

The signal strength is greater than −72 dBm as the reception sensitivity RS, thereby being detected by the radar system as an effective signal. Accordingly, the radio wave of 26.5 GHz received by the second array antenna 32 has to be attenuated by the waveguide structure 35 prior to reception.

In order to make the signal strength of the third harmonic wave lower than the reception sensitivity RS, as indicated by a thin solid line in FIG. 17, it is preferable that the amount of attenuation be approximately 10 dB, and it is more preferable that the amount of attenuation be approximately 20 dB with a margin. By attenuating the radio wave of 26.5 GHz with the waveguide structure 35 by 10 dB, the signal strength of the third harmonic wave can be made lower than the reception sensitivity RS of the radar system. Further, by attenuating the radio wave of 26.5 GHz with the waveguide structure 35 by 20 dB, the signal strength of the third harmonic wave can be made sufficiently lower than the reception sensitivity RS of the radar system.

Although various assumptions are introduced in the example illustrated in FIG. 17, these assumptions reflect a situation used in an actual radar system and the 5G communication system. Therefore, in general, it is preferable that the amount of attenuation of the radio wave at the operating frequency of the first array antenna 31 by the waveguide structure 35 be equal to or greater than 10 dB, and more preferably equal to or greater than 20 dB. The amount of attenuation of the radio wave by the waveguide structure 35 can be adjusted by adjusting the height of the waveguide structure 35 (corresponding to the length of the waveguide).

Tenth Example

Next, a communication device according to a tenth example will be described with reference to FIG. 18A. Hereinafter, description of configurations common to those of the communication device according to the ninth example (FIG. 15A to FIG. 17) will be omitted.

Figure 18A:
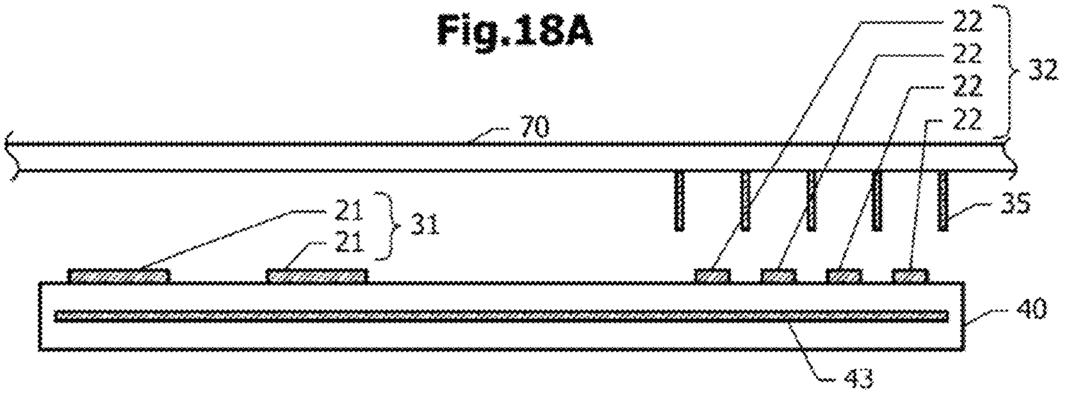
FIG. 18A is a cross-sectional view of a communication device according to a tenth example.

FIG. 18A is a cross-sectional view of a communication device according to the tenth example. In the communication device according to the ninth example, the waveguide structure 35 (FIG. 1B) is in contact with both the substrate 40 and the housing 70. On the other hand, in the tenth example, the waveguide structure 35 is fixed to the housing 70 with an adhesive and is not in contact with the substrate 40. Note that the housing 70 and the waveguide structure 35 may be manufactured by insert molding.

When the substrate 40 is mounted in the housing 70, the plurality of second radiating elements 22 of the second array antenna 32 is aligned with the waveguide structure 35. As a result, the positional relationship between the plurality of second radiating elements 22 and the waveguide structure 35 in a plan view can be the same as that in the ninth example.

Next, a communication device according to a modification of the tenth example will be described with reference to FIG. 18B.

Figure 18B:
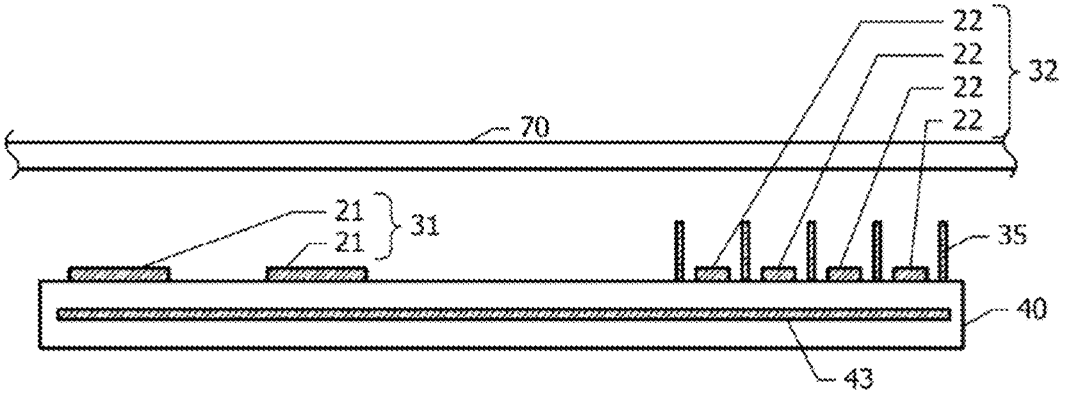
FIG. 18B is a cross-sectional view of a communication device according to a modification of the tenth example.

FIG. 18B is a cross-sectional view of the communication device according to a modification of the tenth example. In this modification, the waveguide structure 35 is fixed to the substrate 40 with an adhesive, and is not in contact with the housing 70.

Even when the waveguide structure 35 is not in contact with one of the substrate 40 and the housing 70 as in the tenth example or the modification thereof, an effect similar to that of the ninth example can be obtained.

Eleventh Example

Next, a communication device according to an eleventh example will be described with reference to FIG. 19A and FIG. 19B. Hereinafter, description of configurations common to those of the communication device according to the ninth example (FIG. 15A to FIG. 17) will be omitted.

Figure 19A:
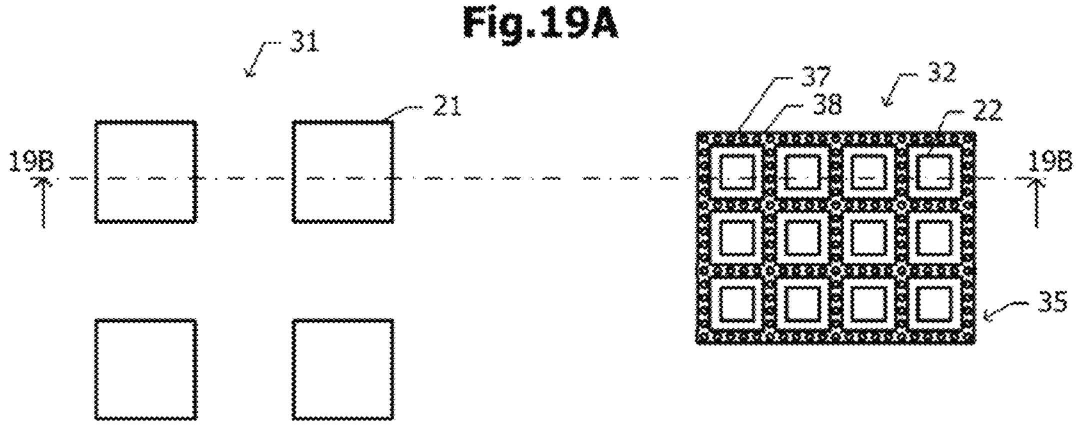
FIG. 19A is a plan view of an antenna device used in a communication device according to an eleventh example.
Figure 19B:
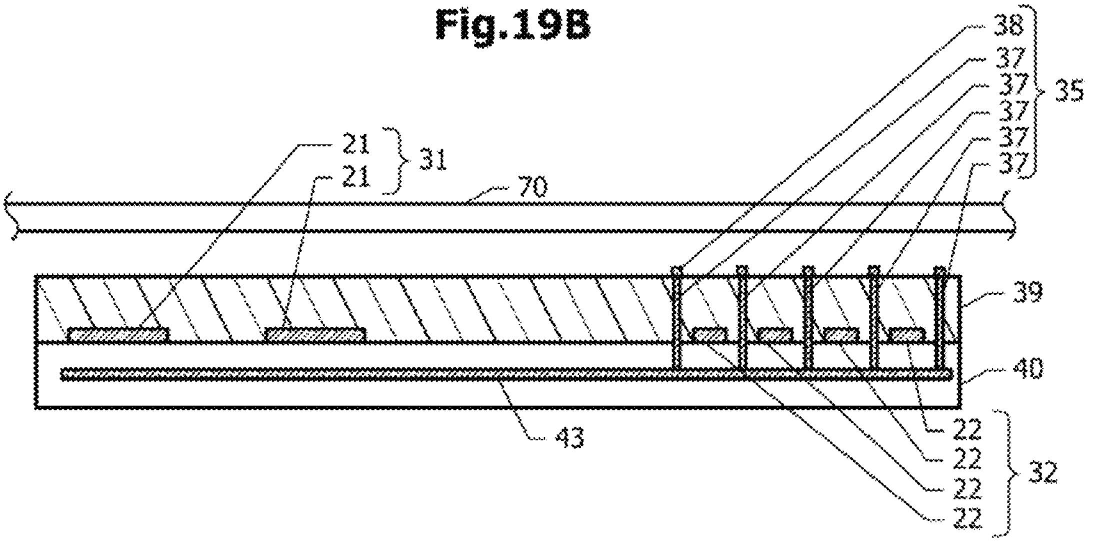
FIG. 19B is a cross-sectional view taken along a dashed-dotted line 19B-19B of FIG. 19A.

FIG. 19A is a plan view of an antenna device used in the communication device according to the eleventh example, and FIG. 19B is a cross-sectional view taken along a dashed-dotted line 19B-19B of FIG. 19A. In the ninth example, the waveguide structure 35 (FIG. 15A, FIG. 15C) is composed of lattice-shaped metal walls. On the other hand, in the eleventh example, the waveguide structure 35 is formed by a plurality of conductor columns 37 and a lattice-shaped conductor pattern 38.

A dielectric film 39 covering the first array antenna 31 and the second array antenna 32 is arranged on the substrate 40. A plurality of conductor columns 37 arranged along a lattice-shaped straight line group in a plan view is embedded in the dielectric film 39. The second radiating elements 22 of the second array antenna 32 are respectively arranged in gap portions between the lattice-shaped straight lines formed by the plurality of conductor columns 37.

Upper ends of the plurality of conductor columns 37 are exposed on the upper surface of the dielectric film 39. The conductor pattern 38 is arranged on the dielectric film 39 so as to pass through the upper ends of the conductor columns 37 exposed on the upper surface of the dielectric film 39, and electrically connects the upper ends of the plurality of conductor columns 37 to each other. Lower ends of the plurality of conductor columns 37 reach the ground conductor 43 in the substrate 40 and are electrically connected to the ground conductor 43. An interval between the plurality of conductor columns 37 is set to such an extent that a space corresponding to a cavity of the lattice formed by the plurality of conductor columns 37 functions as a waveguide for a radio wave of an operating frequency of the second array antenna 32. For example, the interval between the plurality of conductor columns 37 is set to be equal to or less than ¼ of the wave length in the dielectric film 39 of the radio wave of the operating frequency of the second array antenna 32. The plurality of conductor columns 37 arranged so as to surround one second radiating element 22 in a plan view and the conductor pattern 38 electrically connecting upper ends of the conductor columns 37 to each other function as a unit waveguide corresponding to one second radiating element 22.

Next, an effect of the eleventh example will be described.

Also in the eleventh example, since the waveguide structure 35 attenuates radio waves in the operating frequency band of the first array antenna 31, an effect similar to that of the ninth example can be obtained. The attenuation amount of radio waves increases as the height from the upper surface of the substrate 40 to the upper end of the waveguide structure 35 increases. In the eleventh example, the cavity 36 (FIG. 15C) of the waveguide structure 35 is filled with the dielectric film 39 having a dielectric constant higher than that of air. Therefore, a substantial length related to radio wave propagation from the upper surface of the substrate 40 to the upper end of the waveguide structure 35 is longer than that in the case where the cavity 36 is hollow. As a result, an effect of increasing the attenuation amount of radio waves by the waveguide structure 35 can be obtained.

Next, a modification of the eleventh example will be described. Although the plurality of conductor columns 37 is connected to the ground conductor 43 in the eleventh example, they do not need to be connected to the ground conductor 43. Further, in the eleventh example, the upper ends of the plurality of conductor columns 37 are connected to each other by the conductor pattern 38, but the plurality of conductor columns 37 may be electrically connected to each other by a lattice-shaped conductor pattern of an inner layer also in an intermediate portion between the upper end and the lower end. By connecting the plurality of conductor columns 37 to each other even at the intermediate portion, the function as a unit waveguide can be enhanced.

Twelfth Example

Next, a communication device according to a twelfth example will be described with reference to FIG. 20. Hereinafter, description of configurations common to those of the communication device according to the ninth example (FIG. 15A to FIG. 17) will be omitted.

Figure 20:
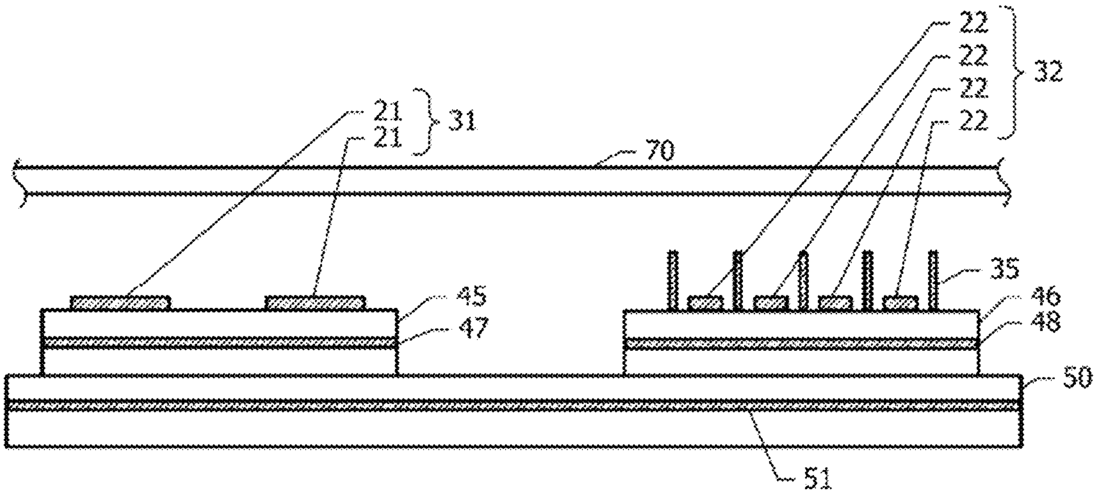
FIG. 20 is a cross-sectional view of a communication device according to a twelfth example.

FIG. 20 is a cross-sectional view of the communication device according to the twelfth example. In the ninth example, the first array antenna 31 and the second array antenna 32 are provided on the common substrate 40 (FIG. 1B), and the substrate 40 is used as a support member that supports the first array antenna 31 and the second array antenna 32. On the other hand, in the twelfth example, the first array antenna 31 and the second array antenna 32 are formed on the first substrate 45 and the second substrate 46, respectively, as in the fourth example (FIG. 6A). The first substrate 45 and the second substrate 46 have the ground conductor 47 and the ground conductor 48 therein, respectively. The waveguide structure 35 is fixed to the second substrate 46.

The first substrate 45 and the second substrate 46 are fixed to the upper surface of the common member 50. The common member 50 is housed in the housing 70 and is fixed to the housing 70.

Next, an effect of the twelfth example will be described. Also in the twelfth example, by arranging the waveguide structure 35, an effect similar to that of the ninth example can be obtained. Further, in the twelfth example, since the first array antenna 31 and the second array antenna 32 are formed on different substrates, the degree of freedom of arrangement of both antennas is increased.

Thirteenth Example

Next, a communication device according to a thirteenth example will be described with reference to FIG. 21A and FIG. 21B. Hereinafter, description of configurations common to the communication devices according to the ninth example (FIG. 15A to FIG. 17) and the tenth example (FIG. 18A) will be omitted.

Figure 21A:
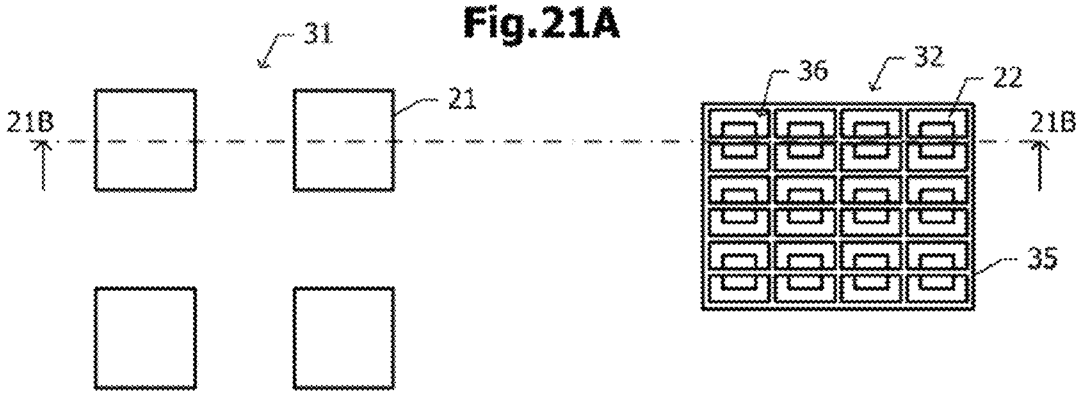
FIG. 21A is a plan view of a communication device according to a thirteenth example.
Figure 21B:
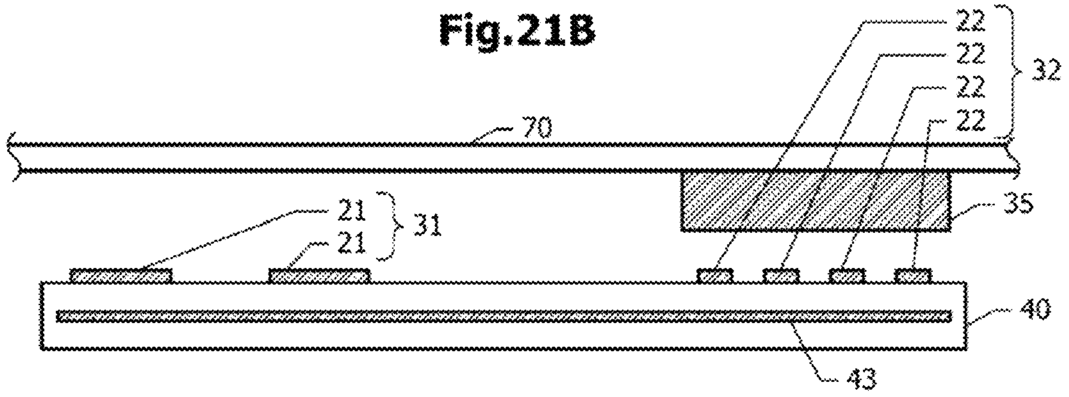
FIG. 21B is a cross-sectional view taken along a dashed-dotted line 21B-21B of FIG. 21A.

FIG. 21A is a plan view of the communication device according to the thirteenth example, and FIG. 21B is a cross-sectional view taken along a dashed-dotted line 21B-21B of FIG. 21A. In the ninth example (FIG. 15A), there is a one-to-one correspondence between the plurality of cavities 36 (FIG. 15C) of the lattice-shaped metal wall forming the waveguide structure 35 and the plurality of second radiating elements 22 of the second array antenna 32. On the other hand, in the thirteenth example, two cavities 36 of the lattice-shaped metal wall forming the waveguide structure 35 correspond to one second radiating element 22. In other words, two unit waveguides are arranged for one second radiating element 22. The waveguide structure 35 is attached to the housing 70 as in the case of the tenth example (FIG. 18A). In a plan view, a linear portion of the metal wall extending in the row direction (a direction parallel to the separation direction DS of FIG. 1A) passes through the center of each of the second radiating elements 22.

Also in the thirteenth example, as in the ninth and tenth examples, the waveguide structure 35 attenuates the radio wave of the fundamental frequency radiated from the first array antenna 31. The radio wave of the frequency transmitted or received by the second array antenna 32 is hardly attenuated by the waveguide structure 35.

Next, an effect of the thirteenth example will be described. Also in the thirteenth example, similarly to the ninth example, the tenth example, and the like, the radio wave of the fundamental frequency that is radiated from the first array antenna 31 and is reflected by the radio wave reflector 75 (FIG. 16), and enters the second array antenna 32 is attenuated by the waveguide structure 35. Therefore, the signal of the fundamental frequency input to the low noise amplifier 87 (FIG. 2) is weakened. As a result, the signal strength of the higher harmonic components generated by the nonlinearity of the low noise amplifier 87 also decreases. Therefore, it is possible to reduce the influence of noise caused by the radio wave radiated from the first array antenna 31 on signals received by the second array antenna 32.

Further, also in the thirteenth example, the relative positional relationship between the plurality of unit waveguides included in the waveguide structure 35 and the plurality of second radiating elements 22 of the second array antenna 32 is the same in all of the second radiating elements 22. Therefore, it is possible to suppress variations in the antenna gain of the second radiating element 22 alone.

Also in the thirteenth example, the polarization direction of the second radiating element 22 is perpendicular to the separation direction DS (FIG. 1A), and the upper and lower edges in FIG. 21A serve as a wave source, as in the first example illustrated in FIG. 1A or the like. In the thirteenth example, the left and right edges of the four edges of the second radiating element 22 of the second array antenna 32 intersect with the metal wall, and the upper and lower edges do not intersect with the metal wall in FIG. 21A. That is, the metal wall does not intersect with the edge serving as a wave source. Therefore, the radiating efficiency of the radio wave from the second radiating element 22 and the antenna gain are less likely to be affected by the metal wall.

Next, a modification of the thirteenth example will be described.

In the thirteenth example, the linear portion of the metal wall extending in the row direction passes through the center of the second radiating element 22 in a plan view, but the linear portion of the metal wall extending in the column direction may pass through the center of the second radiating element 22. Further, in the thirteenth example, two unit waveguides are associated with one second radiating element 22, but three or more unit waveguides may be associated with one second radiating element 22.

Fourteenth Example

Next, a communication device according to a fourteenth example will be described with reference to FIG. 22A and FIG. 22B. Hereinafter, description of configurations common to those of the communication device according to the thirteenth example (FIG. 21A, FIG. 21B) will be omitted.

Figure 22A:
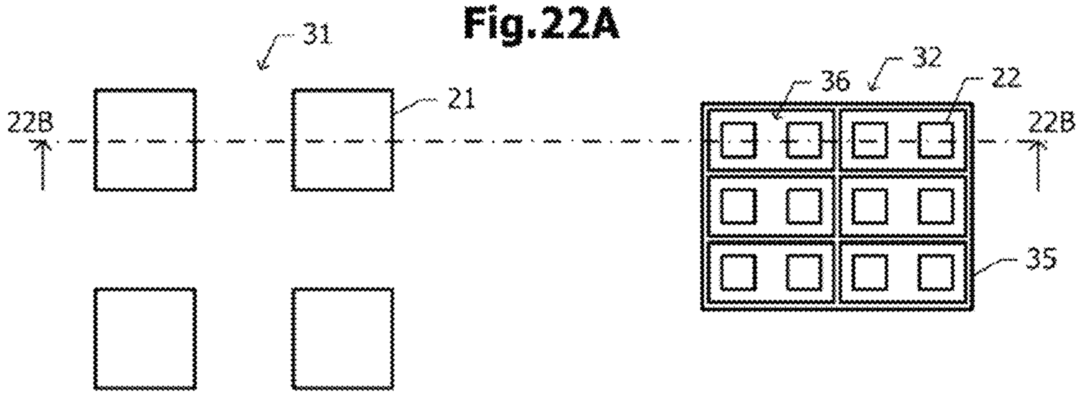
FIG. 22A is a plan view of a communication device according to a fourteenth example.
Figure 22B:
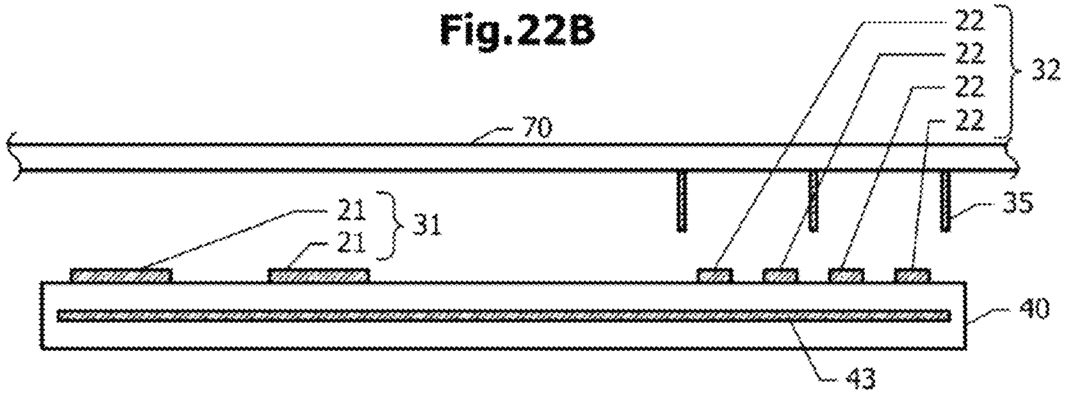
FIG. 22B is a cross-sectional view taken along a dashed-dotted line 22B-22B of FIG. 22A.

FIG. 22A is a plan view of the communication device according to the fourteenth example, and FIG. 22B is a cross-sectional view taken along a dashed-dotted line 22B-22B of FIG. 22A. In the thirteenth example, two unit waveguides are associated with one second radiating element 22. On the other hand, in the fourteenth example, one unit waveguide is associated with two second radiating elements 22. Specifically, one unit waveguide is arranged for two second radiating elements 22 arranged in the row direction. The shape of each of the unit waveguides in a plan view is a rectangle that is long in the row direction, and two second radiating elements 22 are included in one unit waveguide in a plan view.

Also in the fourteenth example, as in the thirteenth example, the waveguide structure 35 attenuates the radio wave of the fundamental frequency radiated from the first array antenna 31. The radio wave of frequency transmitted or received by the second array antenna 32 is hardly attenuated by the waveguide structure 35.

Next, an effect of the fourteenth example will be described. Also in the fourteenth example, similarly to the thirteenth example, it is possible to reduce the influence of noise caused by the radio wave radiated from the first array antenna 31 on signals received by the second array antenna 32.

Next, a modification of the fourteenth example will be described. In the fourteenth example, two second radiating elements 22 are associated with one unit waveguide, but three or more second radiating elements 22 may be associated with one unit waveguide. For example, three or more second radiating elements 22 may be included in one unit waveguide in a plan view. In addition, in the fourteenth example, one unit waveguide is associated with two second radiating elements 22 arranged in the row direction, but may be associated with the plurality of second radiating elements 22 arranged in the column direction.

Fifteenth Example

Next, a communication device according to a fifteenth example will be described with reference to FIG. 23A and FIG. 23B. Hereinafter, description of configurations common to those of the communication device according to the first example (FIG. 1A to FIG. 3) will be omitted.

Figure 23A:
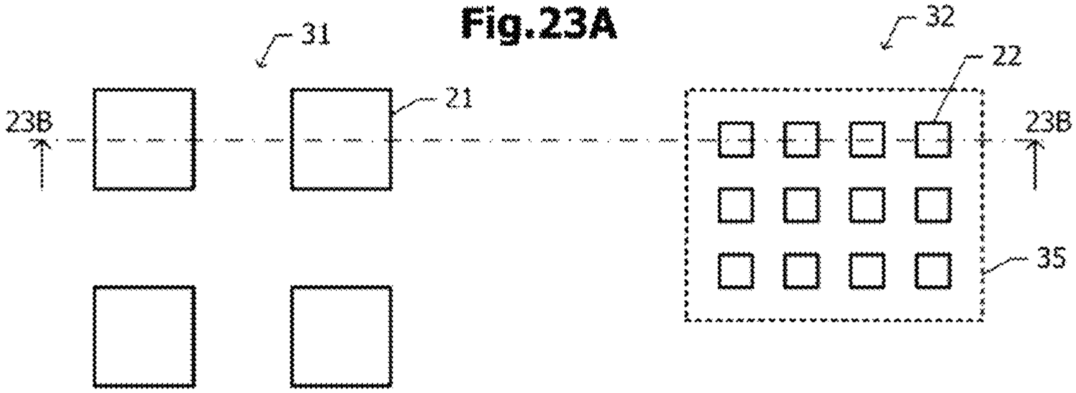
FIG. 23A is a plan view of a communication device according to a fifteenth example.
Figure 23B:
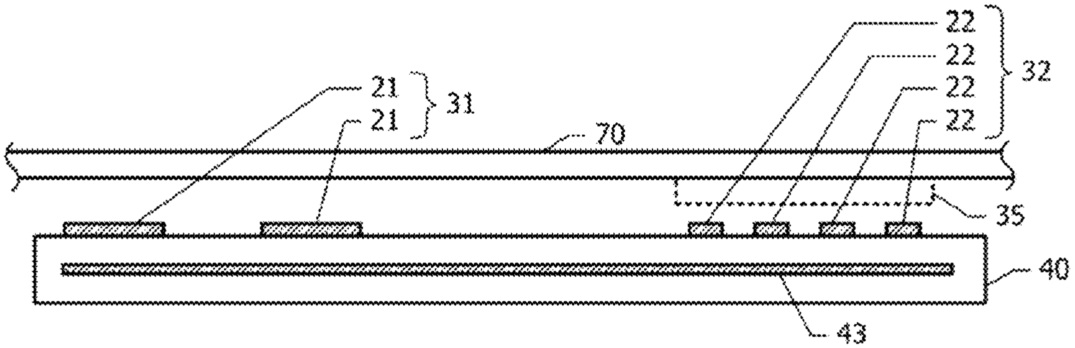
FIG. 23B is a cross-sectional view taken along a dashed-dotted line 23B-23B in FIG. 23A.

FIG. 23A is a plan view of the communication device according to the fifteenth example, and FIG. 23B is a cross-sectional view taken along a dashed-dotted line 23B-23B of FIG. 23A. According to the fifteenth example, the communication device includes the substrate 40, the first array antenna 31, and the second array antenna 32. These configurations are the same as those of the antenna device (FIG. 1A, FIG. 1B) according to the first example. The communication device according to the ninth example further includes the housing 70 and the waveguide structure 35.

The waveguide structure 35 includes unit waveguides arranged in a path of the radio wave received by the second array antenna 32. Further, the waveguide structure 35 is arranged at an outer side portion of the range of the half-value angle of the main beam when viewed from the first array antenna 31. As the waveguide structure 35, it is possible to use a structure having a waveguide function of attenuating the radio wave of the operating frequency of the first array antenna 31 more than the radio wave of the operating frequency of the second array antenna 32.

Next, an effect of the fifteenth example will be described. Also in the fifteenth example, as in the ninth example, it is possible to reduce the influence of noise caused by the radio wave radiated from the first array antenna 31 on signals transmitted and received by the second array antenna 32.

Sixteenth Example

Next, an antenna device according to a sixteenth example will be described with reference to FIG. 24A and FIG. 24B. Hereinafter, description of configurations common to those of the antenna device according to the first example (FIG. 1A, FIG. 1B) will be omitted.

Figure 24A:
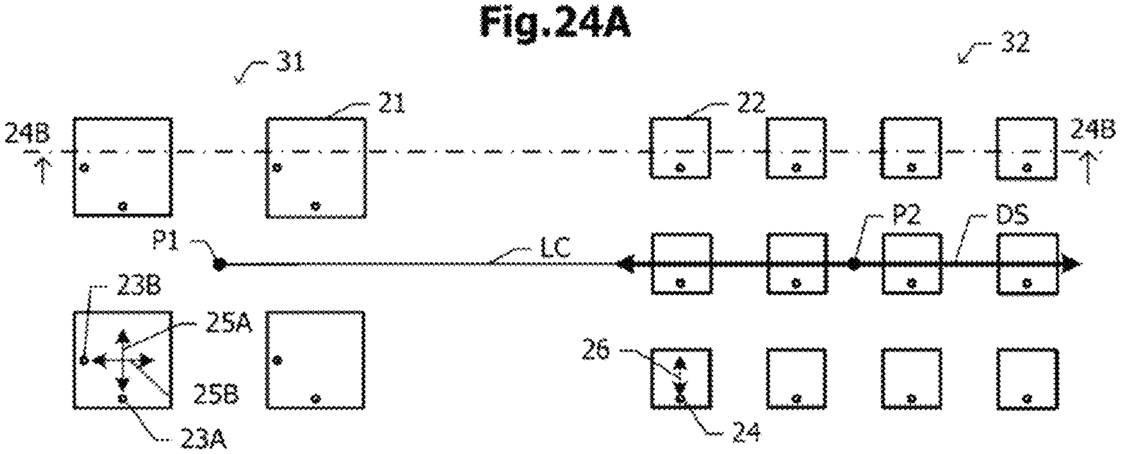
FIG. 24A is a diagram illustrating an arrangement of a plurality of radiating elements of an antenna device according to a sixteenth example.
Figure 24B:
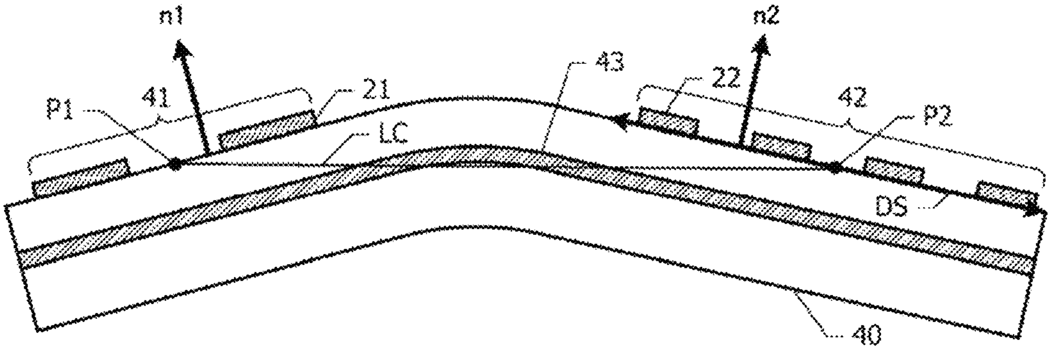
FIG. 24B is a cross-sectional view taken along a dashed-dotted line 24B-24B of FIG. 24A.

FIG. 24A is a diagram illustrating an arrangement of a plurality of radiating elements of the antenna device according to the sixteenth example, and FIG. 24B is a cross-sectional view taken along a dashed-dotted line 24B-24B of FIG. 24A. In the first example, the first region 41 and the second region 42 defined on the surface of the substrate 40 are arranged on the same plane. On the other hand, in the sixteenth example, the substrate 40 is curved at a portion between the first region 41 and the second region 42, and the first region 41 and the second region 42 are not arranged on the same plane. For example, a flexible substrate can be used as the substrate 40. A virtual plane including the first region 41 and a virtual plane including the second region 42 intersect with each other at a certain angle.

An angle formed by an outward normal vector n1 of the first region 41 and an outward normal vector n2 of the second region 42 is less than 90°. In the first example (FIG. 1A), the straight line connecting the geometric center positions P1 and P2 is arranged on the surface of the substrate 40. On the other hand, in the sixteenth example, since the substrate 40 is curved, a straight line LC connecting the geometric center positions P1 and P2 is not located on the surface of the substrate 40. In this case, a direction of the line of intersection between the second region 42 and a plane that includes the straight line LC connecting the geometric center positions P1 and P2 and is orthogonal to the second region 42 (the plane of FIG. 24B) is defined as the separation direction DS. Also in the sixteenth example, similarly to the first example, the angle formed by the separation direction DS and the polarization direction of the second radiating element 22 is 90°. When the second region 42 is viewed along the normal direction of the second region 42, the straight line LC overlaps the separation direction DS. Therefore, when the second region 42 is viewed along the normal direction of the second region 42, the angle formed by the separation direction DS, which is the direction of the straight line LC, and the polarization direction of the second radiating element 22 is 90°.

Next, an effect of the sixteenth example will be described.

In also the sixteenth example, as in the first example, it is possible to obtain an effect that the second radiating element 22 is hardly affected by higher harmonic components of the radio wave in the polarization direction 25B radiated from the first radiating element 21.

Next, a modification of the sixteenth example will be described.

Although the angle formed by the separation direction DS and the polarization direction of the second radiating element 22 is 90° in the sixteenth example, the angle formed by the separation direction DS and the polarization direction of the second radiating element 22 may be equal to or greater than 45° and equal to or less than 90° as in the second example (FIG. 4A), the modification of the second example (FIG. 4B), and the third example (FIG. 5). That is, when the second region 42 is viewed along the normal direction of the second region 42, an angle formed by the separation direction DS, which is the direction of the straight line LC connecting the geometric center position P1 of all of the first radiating elements 21 and the geometric center position P2 of all of the second radiating elements 22, and the polarization direction of the second radiating element 22 may be equal to or greater than 45° and equal to or less than 90°.

Each of the above-described examples is an example, and it is needless to say that partial replacement or combination of configurations illustrated in different examples is possible. The same operation and effect by the same configuration of the plurality of examples will not be sequentially described for each example. Furthermore, the present disclosure is not limited to the examples described above. For example, it will be obvious to those skilled in the art that various changes, improvements, combinations, and the like can be made.

REFERENCE SIGNS LIST

21 FIRST RADIATING ELEMENT
22 SECOND RADIATING ELEMENT
23A, 23B FEEDING POINT OF FIRST RADIATING ELEMENT
24 FEEDING POINT OF SECOND RADIATING ELEMENT 22
25A, 25B, 26 POLARIZATION DIRECTION
31 FIRST ARRAY ANTENNA
32 SECOND ARRAY ANTENNA
32R SECOND ARRAY ANTENNA FOR RECEPTION
32T SECOND ARRAY ANTENNA FOR TRANSMISSION
33 FIRST TRANSMISSION/RECEPTION CIRCUIT
34 SECOND TRANSMISSION/RECEPTION CIRCUIT
35 WAVEGUIDE STRUCTURE
36 CAVITY
37 CONDUCTOR COLUMN
38 CONDUCTOR PATTERN
39 DIELECTRIC FILM
40 SUBSTRATE
41 FIRST REGION
42 SECOND REGION
43 GROUND CONDUCTOR
45 FIRST SUBSTRATE
46 SECOND SUBSTRATE
47, 48 GROUND CONDUCTOR
50 COMMON MEMBER
51 GROUND CONDUCTOR
60 CONDUCTIVE MEMBER
70 HOUSING
71 ANTENNA DEVICE
72 GAP
73 METAL STRIP
75 RADIO WAVE REFLECTOR
80 SIGNAL PROCESSING CIRCUIT
81 LOCAL OSCILLATOR
82 TRANSMISSION PROCESSING UNIT
83 SWITCH
84 POWER AMPLIFIER
85 RECEPTION PROCESSING UNIT
86 MIXER
87 LOW NOISE AMPLIFIER
90 HIGH-FREQUENCY INTEGRATED CIRCUIT ELEMENT
91 INTERMEDIATE FREQUENCY AMPLIFIER
92 UP-DOWN CONVERSION MIXER
93 TRANSMISSION/RECEPTION SWITCH
94 POWER DIVIDER
95 PHASE SHIFTER
96 ATTENUATOR
97 TRANSMISSION/RECEPTION SWITCH
98 POWER AMPLIFIER
99 LOW NOISE AMPLIFIER
100 TRANSMISSION/RECEPTION SWITCH
110 BASEBAND INTEGRATED CIRCUIT ELEMENT
DS SEPARATION DIRECTION
P1 GEOMETRIC CENTER POSITION OF ALL FIRST RADIATING ELEMENT
P2 GEOMETRIC CENTER POSITION OF ALL SECOND RADIATING ELEMENT

The invention claimed is:

1. An antenna device, comprising:
a substrate including a planar first region and a planar second region;
at least one first radiating element, arranged in the first region of the substrate, configured to perform at least one of transmission and reception of a radio wave of a first frequency; and
a plurality of second radiating elements arranged in a matrix in the second region of the substrate, the plurality of second radiating elements configured to perform at least one of transmission and reception of a radio wave of a second frequency higher than the first frequency, wherein
the plurality of second radiating elements includes a first part and a second part,
the first part of the plurality of second radiating elements configures a first array antenna for transmission,
the second part of the plurality of second radiating elements configures a second array antenna for reception,
a separation direction is a direction of a straight line connecting a first geometric center position of the at least one first radiating element and a second geometric center position of the plurality of second radiating elements, and
in a case that the second region is viewed along a normal direction of the second region, an angle formed by the separation direction and a direction connecting the second geometric center position and a feeding point of the plurality of second radiating elements is equal to or greater than 45° and equal to or less than 90°.

2. The antenna device according to claim 1, wherein the first region and the second region are located on a same plane.

3. The antenna device according to claim 1, wherein the first region and the second region are parallel to each other.

4. The antenna device according to claim 1, wherein the separation direction and a polarization direction of the plurality of second radiating elements are orthogonal to each other.

5. The antenna device according to claim 1, wherein the first region and the second region are defined in a common substrate.

6. The antenna device according to claim 1, wherein the substrate includes:
a first substrate including the first region;
a second substrate including the second region; and
a common substrate that supports the first substrate and the second substrate.

7. The antenna device according to claim 6, wherein the at least one first radiating element includes a plurality of first radiating elements arranged to form a first antenna.

8. The antenna device according to claim 7, further comprising:
a plurality of first waveguides arranged in the first region; and
a plurality of second waveguides arranged in the second region.

9. The antenna device according to claim 1, wherein the at least one first radiating element includes a plurality of first radiating elements arranged to form a first antenna.

10. The antenna device according to claim 9, wherein a pair of edges of the at least one first radiating element are parallel to the separation direction, and a pair of edges of each second radiating element of the plurality of second radiating elements are included by an angle with respect to the separation direction, the angle being greater than 0° and less than 90°.

11. The antenna device according to claim 1, further comprising:

a plurality of conductors arranged between the first region and the second region in a plan view, wherein the plurality of conductors is arranged in a direction intersecting with the separation direction in the plan view, and a dimension of each conductor of the plurality of conductors in a direction orthogonal to the first region and the second region is larger than a dimension of each conductor of the plurality of conductors in a polarization direction of the second radiating element.

12. A communication device, comprising:

the antenna device according to claim 1; and a housing made of a dielectric material and arranged to be spaced apart from the first region and the second region in a direction orthogonal to the first region and the second region, wherein a ground conductor is arranged in the substrate between the first region and the second region in a plan view, and an interval from the ground conductor to the housing is equal to or less than 0.5 times a wave length based on an operating frequency of the plurality of second radiating elements.

13. A communication device, comprising:

the antenna device according to claim 1;

a housing made of a dielectric material and arranged to be spaced apart from the first region and the second region in a direction orthogonal to the first region and the second region; and a metal strip provided in the housing and arranged between the first region and the second region in a plan view.

14. The antenna device according to claim 1, further comprises a parasitic element located on the at least one first radiating element or on a second radiating element of the plurality of second radiating elements.

15. An antenna device, comprising:

a substrate including a planar first region and a planar second region;

at least one first radiating element, arranged in the first region, configured to perform at least one of transmission and reception of a radio wave of a first frequency; and a plurality of second radiating elements arranged in a matrix in the second region, the plurality of second radiating elements configured to perform at least one of transmission and reception of a radio wave of a second frequency higher than the first frequency, wherein the plurality of second radiating elements form a patch antenna together with a ground conductor, the plurality of second radiating elements includes a first part and a second part, the first part of the plurality of second radiating elements configures a first array antenna for transmission, the second part of the plurality of second radiating elements configures a second array antenna for reception, a separation direction is a direction of a straight line connecting a first geometric center position of the at least one first radiating element and a second geometric center position of the plurality of second radiating elements, and in a case that the second region is viewed along a normal direction of the second region, an angle formed by the separation direction and a direction connecting the second geometric center position and a feeding point is equal to or greater than 45° and equal to or less than 90°.

16. The antenna device according to claim 15, wherein the at least one first radiating element includes a plurality of first radiating elements arranged to form a first antenna.

17. An antenna device, comprising:

a substrate including a planar first region and a planar second region;

at least one first radiating element, arranged in the first region of the substrate, configured to perform at least one of transmission and reception of a radio wave of a first frequency;

a plurality of second radiating elements arranged in a matrix in the second region of the substrate, the plurality of second radiating elements configured to perform at least one of transmission and reception of a radio wave of a second frequency higher than the first frequency; and a plurality of conductors arranged between the first region and the second region in a plan view, wherein the plurality of second radiating elements includes a first part and a second part, the first part of the plurality of second radiating elements configures a first array antenna for transmission, the second part of the plurality of second radiating elements configures a second array antenna for reception, a separation direction is a direction of a straight line connecting a first geometric center position of the at least one first radiating element and a second geometric center position of the plurality of second radiating elements, and in a case that the second region is viewed along a normal direction of the second region, an angle formed by the separation direction and a direction connecting the second geometric center position and a feeding point of the at least one second radiating element is equal to or greater than 45° and equal to or less than 90°.

18. A communication device, comprising:

the antenna device according to claim 17; and a housing made of a dielectric material and arranged to be spaced apart from the first region and the second region in a direction orthogonal to the first region and the second region, wherein a ground conductor is arranged in the substrate between the first region and the second region in a plan view, and an interval from the ground conductor to the housing is equal to or less than 0.5 times a wave length based on an operating frequency of the plurality of second radiating elements.

19. A communication device, comprising:

the antenna device according to claim 17;

a housing made of a dielectric material and arranged to be spaced apart from the first region and the second region in a direction orthogonal to the first region and the second region; and a metal strip provided in the housing and arranged between the first region and the second region in a plan view.

20. The antenna device according to claim 17, wherein in a case that the second region is viewed along the normal direction of the second region, an angle formed by the separation direction and a polarization direction of the plurality of second radiating elements is equal to or greater than 45° and equal to or less than 90°.

* * * * *